(12) United States Patent
Marks et al.

(10) Patent No.: US 8,602,894 B2
(45) Date of Patent: Dec. 10, 2013

(54) ILLUMINATING CONTROLLER FOR INTERFACING WITH A GAMING SYSTEM

(75) Inventors: Richard Marks, Foster City, CA (US); Hrishikesh Despande, Foster City, CA (US); Gary M. Zalewski, Foster City, CA (US)

(73) Assignee: Sony Computer Entertainment, Inc., Tokyo (JP)

(*) Notice: Subject to any disclaimer, the term of this patent is extended or adjusted under 35 U.S.C. 154(b) by 10 days.

(21) Appl. No.: 12/960,433

(22) Filed: Dec. 3, 2010

(65) Prior Publication Data

US 2011/0077082 A1 Mar. 31, 2011

Related U.S. Application Data

(63) Continuation of application No. 11/588,779, filed on Oct. 26, 2006, now Pat. No. 8,062,126.

(60) Provisional application No. 60/730,659, filed on Oct. 26, 2005.

(51) Int. Cl.
*G09G 5/00* (2006.01)
*A63F 9/24* (2006.01)

(52) U.S. Cl.
USPC .......................................... 463/36; 345/156

(58) Field of Classification Search
USPC ....................................... 345/156; 463/36–46
See application file for complete search history.

(56) References Cited

U.S. PATENT DOCUMENTS

| 4,787,051 | A | 11/1988 | Olson ............................ 364/518 |
| 4,843,568 | A | 6/1989 | Krueger et al. ................. 364/518 |
| 5,128,671 | A | 7/1992 | Thomas, Jr. ..................... 341/20 |
| 5,528,265 | A | 6/1996 | Harrison ......................... 345/158 |
| 6,157,368 | A | 12/2000 | Fager .............................. 345/156 |
| 6,375,572 | B1 | 4/2002 | Masuyama et al. .............. 463/43 |
| 2002/0085097 | A1 | 7/2002 | Colmenarez et al. .......... 348/211 |
| 2002/0103025 | A1* | 8/2002 | Murzanski et al. .............. 463/37 |
| 2004/0207597 | A1* | 10/2004 | Marks ............................ 345/156 |
| 2004/0212589 | A1 | 10/2004 | Hall et al. ...................... 345/156 |
| 2005/0130743 | A1* | 6/2005 | Leifer .............................. 463/39 |
| 2006/0084504 | A1* | 4/2006 | Chan et al. ....................... 463/39 |

(Continued)

FOREIGN PATENT DOCUMENTS

| JP | 9-265346 | 10/1997 | ................. G06F 3/03 |
| JP | 09-265346 | * 10/1997 | ................. G06F 3/03 |

OTHER PUBLICATIONS

Japanese Office Action for Japanese Patent Application 2008-537992 (dated Apr. 5, 2011), citing Reference 1 and 2.

(Continued)

*Primary Examiner* — Amara Abdi
(74) *Attorney, Agent, or Firm* — Martine Penilla Group, LLP

(57) ABSTRACT

A controller for use in interfacing with a computer game. The controller includes a handle having at least one button, and a spherically shaped object connected to only one end of the handle. The spherically shaped object is defined from a translucent plastic material. Further included as part of the controller is an illuminating means defined within the spherically shaped object. A circuit is also provided for interpreting input data from the at least one button and communicating data wirelessly. The circuit is further configured to interface with the illuminating means to trigger illumination of the spherically shaped object to switch from an un-illuminated color to an illuminated color.

19 Claims, 17 Drawing Sheets

(56) References Cited

U.S. PATENT DOCUMENTS

| | | | |
|---|---|---|---|
| 2006/0277571 A1 | 12/2006 | Marks et al. | 725/37 |
| 2007/0117625 A1 | 5/2007 | Marks et al. | 463/30 |
| 2008/0261693 A1 | 10/2008 | Zalewski | 463/31 |

OTHER PUBLICATIONS

Bolt, R.A., "Put-that-there": voice and gesture at the graphics interface, Computer Graphics, vol. 14, No. 3 (ACM SIGGRAPH Conference Proceedings) Jul. 1980, pp. 262-270.

DeWitt, Thomas and Edelstein, Phil "Pantomation: A System for Position Tracking", Proceedings of the $2^{nd}$ Symposium on Small Computers in the Arts, Oct. 1982, pp. 61-69.

Marks et al, "*Illuminating Controller Having an Inertial Sensor for Communicating With a Gaming System*", U.S. Appl. No. 12/960,435, filed Dec. 3, 2010.

Marks et al, "*System and Method for Interfacing With a Computer Program*", U.S. Appl. No. 11/588,799, filed Oct. 26, 2006.

Taiwan Intellectual Property Office, "Taiwan IPO Search Report (with English translation)" for Taiwan Invention Patent Application No. 098129110, completed Jan. 2, 2013.

* cited by examiner

Wired Embodiment

ILLUMINATING CONTROLLER FOR INTERFACING WITH A GAMING SYSTEM

CLAIM OF PRIORITY

This application is a continuation application claiming priority under 35 USC 120, from U.S. patent application Ser. No. 11/588,779, entitled "SYSTEM AND METHOD FOR INTERFACING WITH A COMPUTER PROGRAM," filed on Oct. 26, 2006, now U.S. Pat. No. 8,062,126 which claims priority to U.S. Provisional Patent Application No. 60/730,659, filed Oct. 26, 2005, entitled "SYSTEM AND METHOD FOR INTERFACING WITH A COMPUTER PROGRAM."

BACKGROUND OF THE INVENTION

1. Field of the Invention

This invention relates generally to gesture input to computer systems, and more particularly to visually detecting a change in a device, wherein the change triggers an action on the part of the computer system.

2. Description of the Related Art

There has been a great deal of interest in searching for alternatives to input devices for computing systems. In particular, visual gesture input devices are becoming more popular. Generally speaking, gesture input refers to having an electronic device such as a computing system, video game console, smart appliance, etc., react to some gesture captured by a video camera that tracks an object.

Tracking of moving objects using digital video cameras and processing the video images for producing various displays has been known in the art. For example, FIG. 1 shows hand of a user holding ball 101. Ball 101 may be placed within a field of view of a video camera, and the video camera may track the position of the ball by detecting the circular shape of the ball. Once the position of ball 101 is known, it is then possible to use this information to control a computer program in any number of different ways which are generally known in the art. As an example, there can be a virtual object that forms a moving image on a monitor corresponding to how one moves around ball 101. To display the virtual object, the calculated information is used for fixing the position and orientation of the virtual object in a memory space of a computer, and then rendering of the image is performed by known processing to convert the three-dimensional information into a realistic perspective display.

However, in spite of the above knowledge and techniques, problems continue to hinder successful object tracking, and a particularly difficult problem is extracting precisely only those pixels of a video image that correspond unambiguously to ball 101 of interest. For example, as shown in FIG. 1, the hand holding ball 101 partially blocks the ball. As a result, the image of ball 101 captured by video camera is not perfectly circular in shape. Object tracking methods that rely on detecting a particular circular object are highly susceptible to error because ball 101 is partially blocked by hand holding the ball.

In another example, the video camera may additionally track a glove worn on the hand of a user, where the glove includes sensors that are tracked by a video camera to capture input. While this glove has been tried, users have not embraced the glove because of the inconvenience of having to continually remove and put on the glove.

Thus, there is a need to provide a more reliable method and system to track an interface object, wherein the interface object is convenient for the user.

SUMMARY OF THE INVENTION

Broadly speaking, the present invention fills these needs by providing controller devices, method and system for triggering commands of a program executed on a computing system. It should be appreciated that the present invention can be implemented in numerous ways, including as a method, a system, or a device. Several inventive embodiments of the present invention are described below.

In one embodiment, a controller for interfacing with a computer program executed on a computing system that processes image data captured of an interfacing space defined in front of a display, is provided. The controller includes a controller body having at least one button for communicating input data wirelessly to the computing system. The controller body is configured to be held by a hand of a user. A spherical object connected to one end of the controller body. The spherical object is defined from a translucent material. And, an illumination means for illuminating the spherical object from within the spherical object. The illumination means is configured to light up the translucent material in one or more colors.

In an other embodiment, a controller for use in interfacing with a computer game is disclosed. The controller includes a handle having at least one button, and a spherically shaped object connected to only one end of the handle. The spherically shaped object is defined from a translucent plastic material. Further included as part of the controller is an illuminating means defined within the spherically shaped object. A circuit is also provided for interpreting input data from the at least one button and communicating data wirelessly. The circuit is further configured to interface with the illuminating means to trigger illumination of the spherically shaped object to switch from an un-illuminated color to an illuminated color.

In yet another embodiment, an interfacing device for interfacing with a computer program, executed on a computing system, and for interfacing device, is disclosed. The interfacing device includes a controller body having at least one button for communicating input data wirelessly to the computing system. The controller body has a shape for holding by a human hand. An object connected to one end of the controller body. The object is defined from a translucent material. And, an illumination means for illuminating the object from within the object. The illumination means is configured to brighten the translucent material.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for system and method for triggering commands of a program executed on a computing system. It will be obvious, however, to one skilled in the art, that the present invention may be practiced without some or all of these specific details. In other instances, well known process operations have not been described in detail in order not to unnecessarily obscure the present invention.

The embodiments described herein provide system and method for triggering commands of a program executed on a computing system. In one embodiment, an interface object configured to be detected by an image capture device is defined by a pair of spherical objects attached to a deformable handle. Image capture device can capture two types of movement with this interface object. One movement is the interface object moving relative to the image capture device. As will be explained in more detail below, the second movement is a hand, which holds the interface object, applying pressure to the interface object to cause the pair of spherical objects to move relative to each other. In another embodiment, an interface object is defined by an object attached to a T shaped handle. As will be explained in more detail below, the handle is configured to limit a hand holding the handle from blocking the object from being viewed by the image capture device. In still another embodiment, a game controller is provided. The game controller is capable of interfacing with an interface object. The interface of object of the controller can be integrated with the controller or capable of connecting to the controller via a connection interface. When connected to the controller, the shaped objects (e.g., spheres) may be provided with light. The light may be colored light, light with different intensities, and in some embodiments, the light may indicate an interactive signal or coordinate with the interactive nature of a control operation with a computing system. The various embodiments will thus be described in accordance with the order of the drawings, but without limitation to any particular structure or configuration, as they are provided to illustrate the many permutations, combinations and/or alternatives, within the spirit and broad scope of the enumerated claims.

Figure 1:
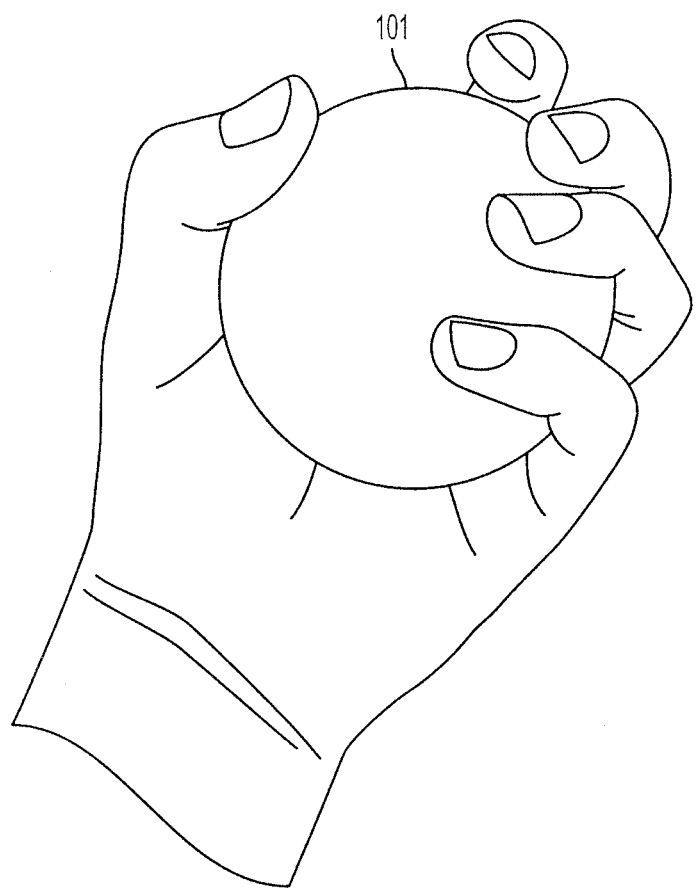
FIG. 1 shows hand of a user holding a conventional interface object.
Figure 2:
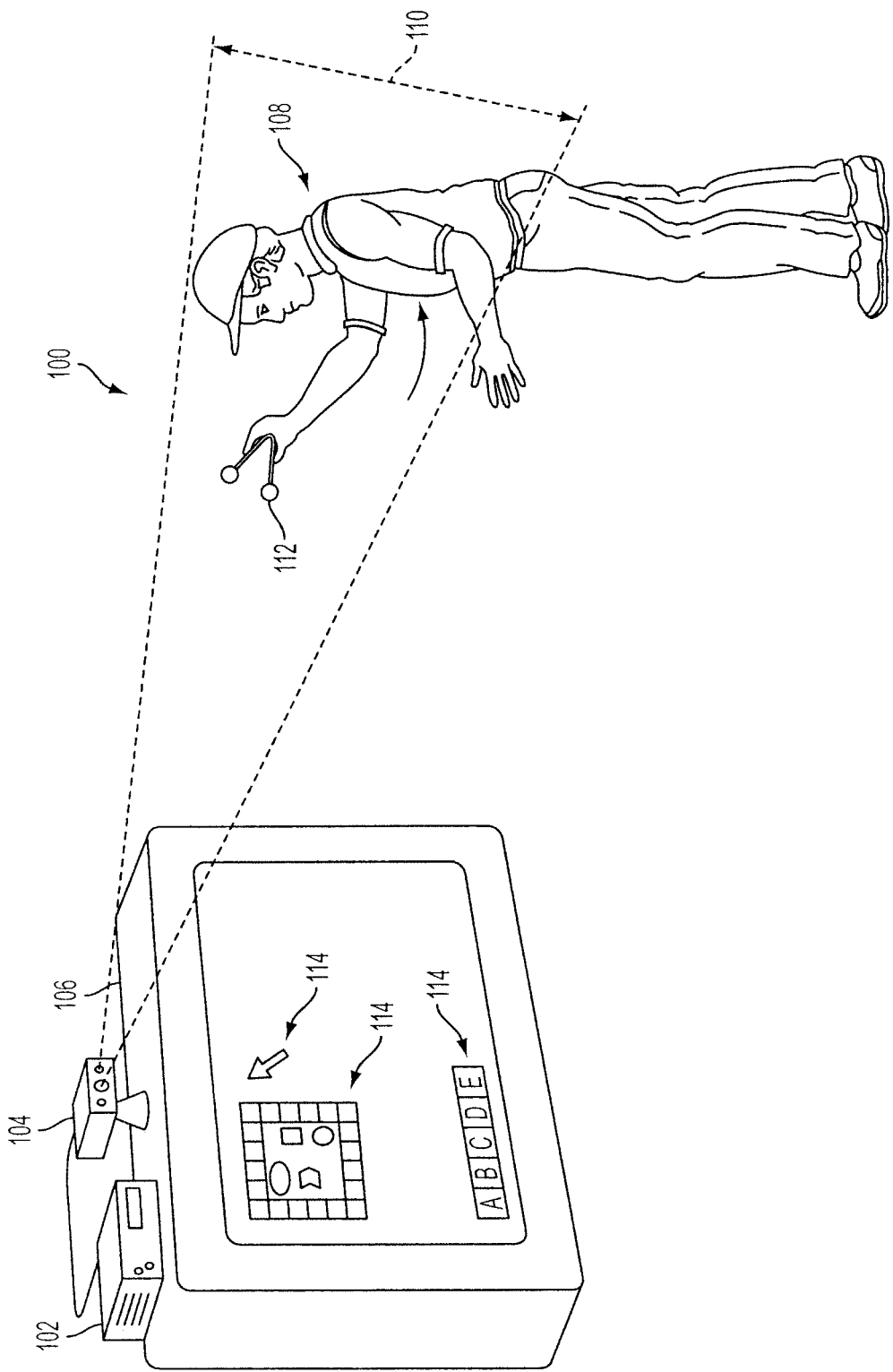
FIG. 2 is a high level schematic diagram of an overall system configuration capable of tracking an interface object, in accordance with one embodiment of the present invention.

FIG. 2 is a high level schematic diagram of an overall system configuration capable of tracking an interface object, in accordance with one embodiment of the present invention. Game interface system 100 includes computing system 102 in communication with image capture device 104 and display 106. Computing system 102 may include any computer device (i.e., device having a processor and memory) that is capable of executing code and interfacing with image capture device 104. Exemplary computing system 102 includes a computer, a digital video disc (DVD) player, a smart appliance, a game console such as the Sony Playstation 2, Sony Playstation 3 (N), other brand game or general purpose computing systems, etc. Computing system 102 would then be capable of executing a program that allows user 108 to interface with graphics of the program.

Image capture device 104 may be a video capturing device that enables frames of images within field of view 110 to be captured and digitized before being transferred to computing system 102. An example of image capture device 104 may be a web cam type video capture device that captures and digitizes images into a number of frames as the images are transferred to computing system 102. Additionally, image capture device 104 may be an analog-type video capture device that continuously captures raw video and then transfers the raw video to computing system 102, whereby the computing system digitizes the raw video into frames.

As shown in FIG. 2, image capture device 104 is designed to capture movement of interface object 112 to enable interaction with a program, such as a video game, executed on computing system 102. For instance, user 108 may utilize movement of interface object 112 to enable interaction with the program. Specifically, in one embodiment, user 108 holds interface object 112 that includes a pair of spherical objects connected by a handle. As will be explained in more detail below, user 108 can move the pair of spherical objects relative to each other by applying pressure to squeeze the two spherical objects together. As user 108 moves interface object 112 into field of view 110 of image capture device 104, the image capture device captures the physical features of the interface object such as size, shape, and color. User 108 can then move the spherical objects of interface object 112 relative to each other or relative to image capture device 104 with his hand (or any part of his body) to cause interaction with the program.

After image capture device 104 captures the physical features of interface object 112, computing system 102 may calculate a two or three dimensional description of the interface object, including its position and orientation in two or three dimensional space, and this description is correspondingly stored in a memory of the computing system. As user 108 changes the position and/or orientation of interface object 112, the description of the interface object in memory, and a corresponding rendering of the interface object in the rendering area of image memory, are continuously updated in order to interface with program executed on computing system 102 and displayed on display 106. For example, as shown in FIG. 2, the movement of interface object 112 triggers an interfacing command allowing user 108 to manipulate objects 114 (e.g., cursors, drawings, windows, menus, etc.) of program. In one example, the movement of interface object 112 allows for clicking and dragging functionality similar to a mouse. That is, by squeezing and/or moving interface object 112, user 108 can move or manipulate objects 114 displayed on display 106.

Figure 3:
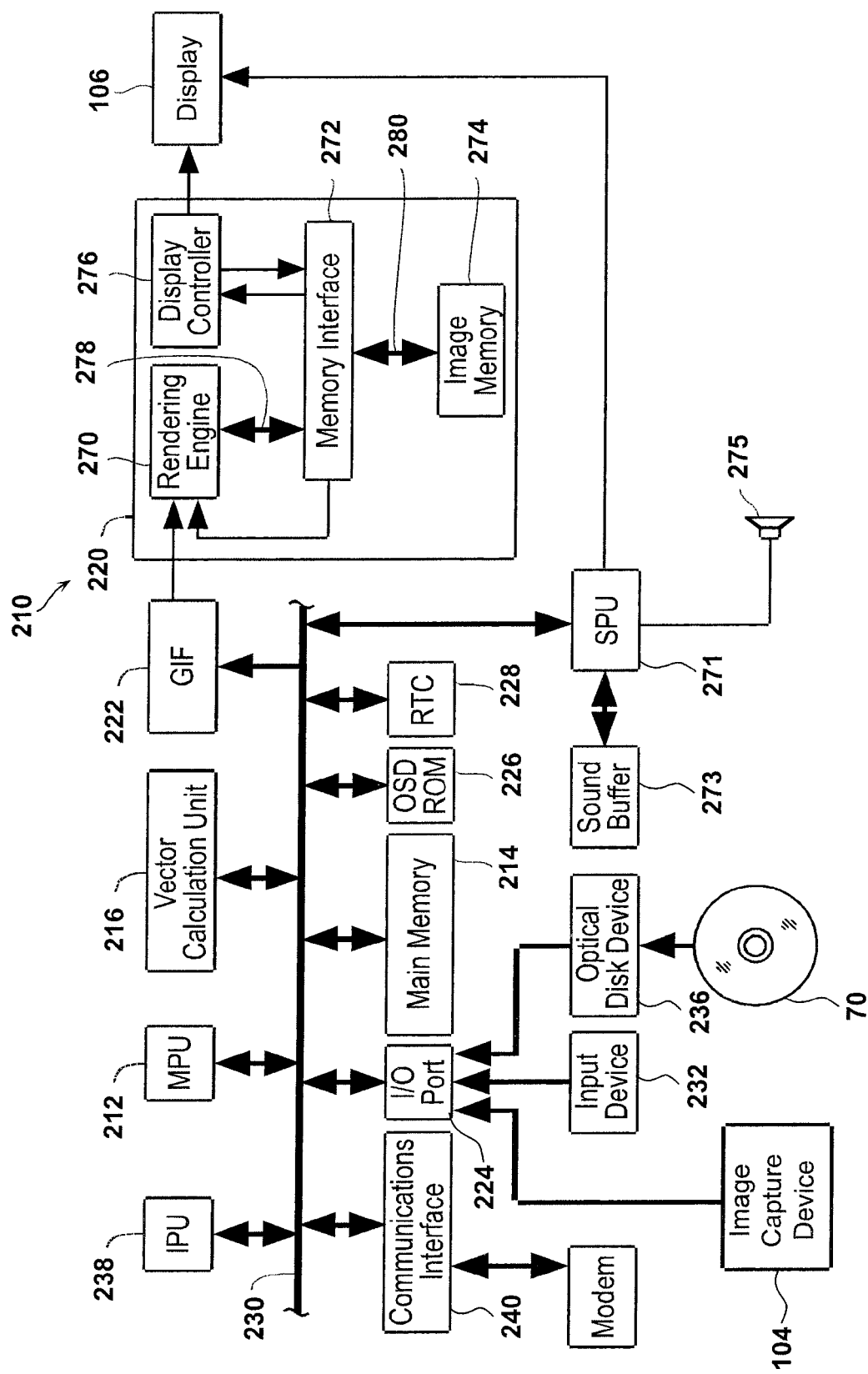
FIG. 3 is a block diagram of a configuration of the components of a computing system adapted for use with an interface object, in accordance with one embodiment of the invention.

FIG. 3 is a block diagram of a configuration of the components of a computing system adapted for use with an interface object, in accordance with one embodiment of the invention. Computing system constitutes a component of an overall entertainment system 210 according to the present invention which, as shown in FIG. 3, is equipped by a multiprocessor unit (MPU) 212 for control of the overall system, main memory 214 which is used for various program operations and for storage of data, vector calculation unit 216 for performing floating point vector calculations necessary for geometry processing, image processor 220 for generating data based on controls from the MPU, and for outputting video signals to display 106 (e.g., a cathode ray tube monitor, a liquid crystal display monitor, etc.), a graphics interface 222 (GIF) for carrying out mediation and the like over a transmission bus between the MPU or the vector calculation unit and the image processor, input/output port 224 for facilitating reception and transmission of a data to and from peripheral devices, internal OSD functional ROM (OSDROM) 226 constituted by, for example, a flash memory, for performing control of a kernel or the like, and real time clock 228 having calendar and timer functions.

Main memory 214, vector calculation unit 216, GIF 222, OSDROM 226, real time clock (RTC) 228, and input/output port 224 are connected to MPU 212 over data bus 230. Also connected to BUS 230 is image processing unit 238 which is a processor for expanding compressed moving images and texture images, thereby developing the image data. For example, the image processing unit 238 can serve functions for decoding and development of bit streams according to the MPEG2 or MPEG4 standard formats, macroblock decoding, performing inverse discrete cosine transformations, color space conversion, vector quantization and the like.

A sound system is constituted by sound processing unit SPU 271 for generating musical or other sound effects on the basis of instructions from MPU 212, sound buffer 273 into which waveform data may be recorded by the SPU, and speaker 275 for outputting the musical or other sound effects generated by the SPU. It should be understood that speaker 275 may be incorporated as part of display 106 or may be provided as a separate audio line-out connection attached to external speaker 275.

Communications interface 240 is also provided, connected to BUS 230, which is an interface having functions of input/output of digital data, and for input of digital contents according to the present invention. For example, through communications interface 240, user input data may be transmitted to, and status data received from, a server terminal on a network in order to accommodate on-line video gaming applications. Input device 232 (also known as a controller) for input of data (e.g. key input data or coordinate data) with respect to the entertainment system 210 optical disk device 236 for reproduction of the contents of optical disk 70, for example a CD-ROM or the like on which various programs and data (i.e. data concerning objects, texture data and the like), are connected to input/output port 224.

As a further extension or alternative to the input device, the present invention includes image capture device 104 which is connected to input/output port 224. Input/output port 224 may be embodied by one or more input interfaces, including serial and USB interfaces, wherein image capture device 104 may advantageously make use of the USB input or any other conventional interface appropriate for use with the image capture device.

The above-mentioned image processor 220 includes rendering engine 270, interface 272, image memory 274, and display control device 276 (e.g. a programmable CRT controller, or the like). Rendering engine 270 executes operations for rendering of predetermined image data in the image memory, through memory interface 272, and in correspondence with rendering commands which are supplied from MPU 212. Rendering engine 270 has the capability of rendering, in real time, image data of 320×240 pixels or 640×480 pixels, conforming to, for example, NTSC or PAL standards, and more specifically, at a rate greater than ten to several tens of times per interval of from 1/60 to 1/30 of a second.

BUS 278 is connected between memory interface 272 and rendering engine 270, and a second BUS 280 is connected between memory interface 272 and image memory 274. First BUS 278 and second BUS 280, respectively, have a bit width of, for example 128 bits, and rendering engine 270 is capable of executing high speed rendering processing with respect to the image memory. Image memory 274 employs a unified memory structure in which, for example, a texture rendering region and a display rendering region, can be set in a uniform area.

Display controller 276 is structured so as to write the texture data which has been retrieved from optical disk 70 through optical disk device 236, or texture data which has been created on main memory 214, to the texture rendering region of image memory 274, via memory interface 272. Image data which has been rendered in the display rendering region of image memory 274 is read out via memory interface 272, outputting the same to display 106 whereby the image data is displayed on a screen thereof.

Figure 4:
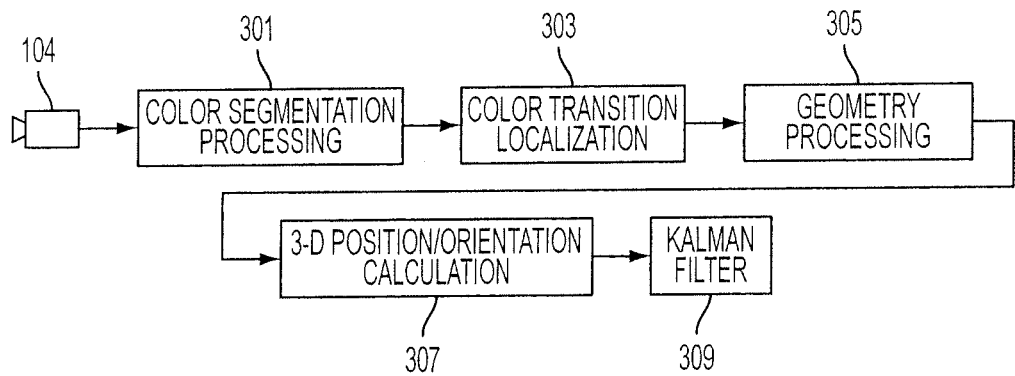
FIG. 4 is a block diagram showing the functional blocks used to track and discriminate a pixel group corresponding to the interface object as the interface object is being manipulated by the user, in accordance with one embodiment of the invention.

FIG. 4 is a block diagram showing the functional blocks used to track and discriminate a pixel group corresponding to the interface object as the interface object is being manipulated by the user, in accordance with one embodiment of the invention. It shall be understood that the functions depicted by the blocks are implemented by software which is executed by the MPU in computing system. Moreover, not all of the functions indicted by the blocks in FIG. 4 are used for each embodiment.

Initially, the pixel data input from image capture device 104 is supplied to computing system through input/output port interface, enabling the following processes to be performed thereon. First, as each pixel of the image is sampled, for example, on a raster basis, a color segmentation processing operation 301 is performed, whereby the color of each pixel is determined and the image is divided into various two-dimensional segments of different colors. Next, for certain embodiments, a color transition localization operation 303 is performed, whereby regions where segments of different colors adjoin are more specifically determined, thereby defining the locations of the image in which distinct color transitions occur. Then, an operation for geometry processing 305 is performed which, depending on the embodiment, comprises either an edge detection process or performing calculations for area statistics, to thereby define in algebraic or geometric terms the lines, curves and/or polygons corresponding to the edges of the object of interest. For example, with the embodiment of the interface object shown in FIG. 2, the pixel area will comprise two generally circular shapes corresponding to an orthogonal frontal view of the interface object. From the algebraic or geometric description of the circular shapes, it is possible to define the centers, radiuses, and orientations of the pixel group corresponding to the interface object.

Returning to FIG. 4, the three-dimensional position and orientation of the object are calculated in operation 307, according to algorithms which are to be described in association with the subsequent descriptions of preferred embodiments of the present invention. The data of three-dimensional position and orientation also undergoes processing operation 309 for Kalman filtering to improve performance. Such processing is performed to estimate where the object is going to be at a point in time, and to reject spurious measurements that could not be possible, and therefore are considered to lie outside the true data set. Another reason for Kalman filtering is that image capture device 104 produces images at 30 Hz, whereas the typical display runs at 60 Hz, so Kalman filtering fills the gaps in the data used for controlling action in the game program. Smoothing of discrete data via Kalman filtering is well known in the field of computer vision and hence will not be elaborated on further.

Figures 5A, 5B:
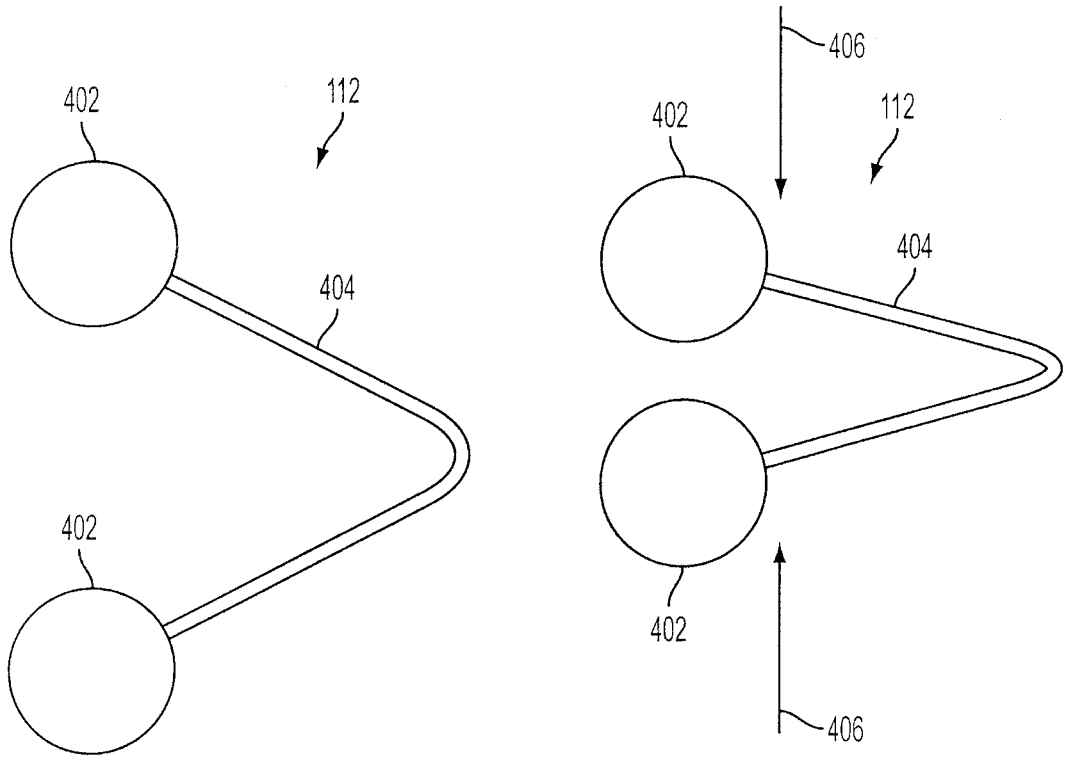
FIGS. 5A and 5B are schematic diagrams of a more detailed view of the interface object shown in FIG. 2, in accordance with one embodiment of the present invention.

FIGS. 5A and 5B are schematic diagrams of a more detailed view of the interface object shown in FIG. 2, in accordance with one embodiment of the present invention. As shown in FIG. 5A, interface object 112 includes a pair of spherical objects 402 coupled together by handle 404. Each spherical object 402 has a ball-shaped body, and the body may be solid or hollow. Spherical objects 402 can be any suitable material. Exemplary materials include plastic, wood, ceramic, metal, etc. Further, surface of spherical objects 402 may have any suitable color or pattern. For example, spherical objects 402 may have a white color that contrasts clearly with a dark background such that the spherical objects can be easily identified. Additionally, surface of spherical objects 402 may have a pattern such that the image capture device can capture the orientation of the pattern for a computing system to determine the orientation of the spherical objects relative to the image capture device.

Handle 404 may be any deformable member that connects the two spherical objects 402. For example, in one embodiment, handle 404 may be a deformable, U shaped member with two opposing ends, whereby each end is coupled to one spherical object 402. To limit a hand holding interface object 112 from blocking pair of spherical objects 402, handle 404 extends away from the spherical objects and, in one embodiment, the handle is designed to fit inside a user's palm. Handle 404 can be made out of any suitable material capable of being deformed through application of pressure and returning to its original shape upon the release of the pressure. Exemplary deformable materials include plastic, metal, wood, etc.

FIG. 5B illustrates the application of pressure on interface object 112. Application of forces 406 (i.e., pressure) causes pair of spherical objects 402 to move relative to each other. For instance, as shown in FIG. 5B, forces 406 on handle 404 or spherical objects 402 cause the pair of spherical objects to move toward each other from opposite directions. Alternatively, the release of forces 406 cause pair of spherical objects 402 to move away from each other in opposite directions because handle 404 returns to its original shape upon release of the forces.

Figure 6:
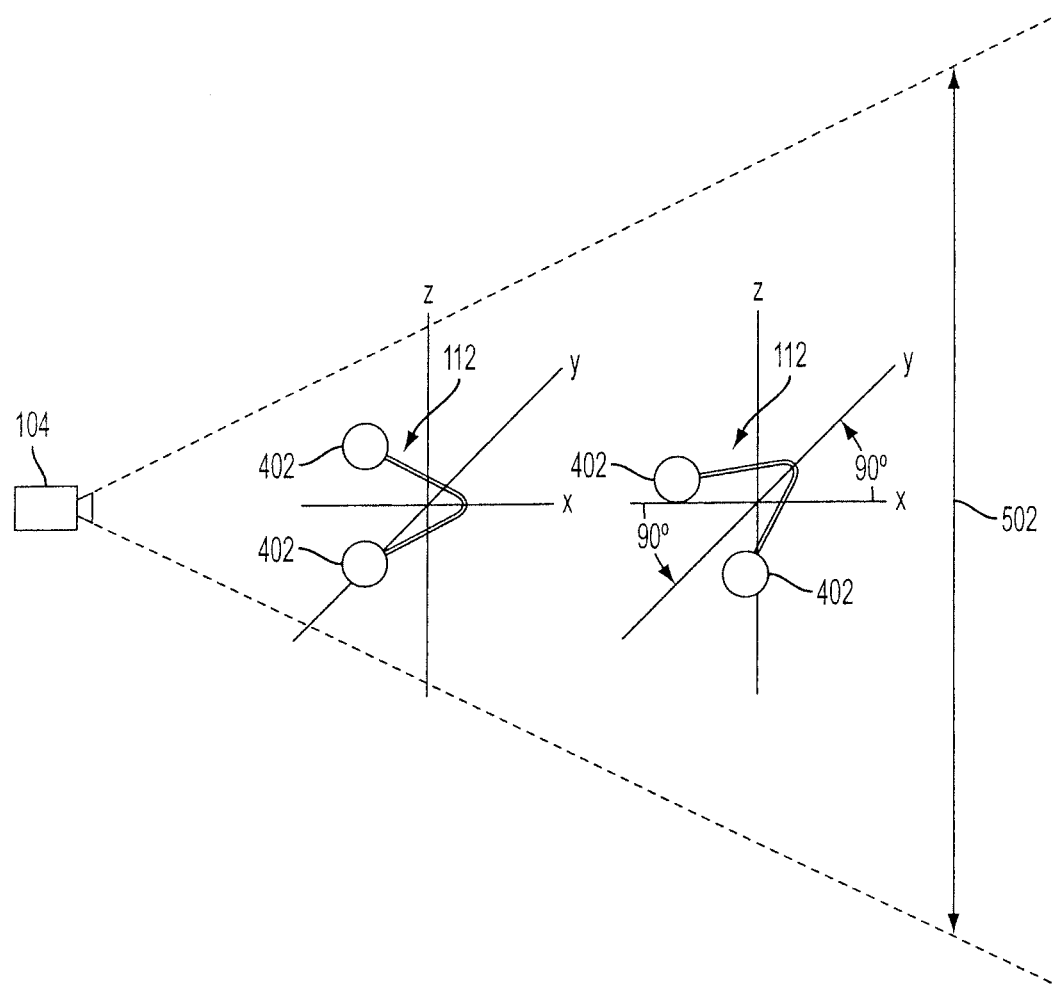
FIG. 6 is a schematic diagram of the interface object shown in FIGS. 5A and 5B placed within field of view of an image capture device, in accordance with one embodiment of the present invention.

FIG. 6 is a schematic diagram of the interface object shown in FIGS. 5A and 5B placed within field of view of an image capture device, in accordance with one embodiment of the present invention. As shown in FIG. 6, interface object 112 is placed within filed of view 502 of image capture device 104. Interface object 112 may move and/or rotate in X, Y, and Z directions. As long as interface object 112 is within field of view 502, image capture device 104 detects the circular shapes of pair of spherical objects 402 at substantially any direction and angle. In other words, since each object 402 is spherical, the spherical object has a circular shape when viewed from any direction and angle along the X, Y, and Z axis. For example, as shown in FIG. 6, image capture device 104 detects two generally circular shapes corresponding to an orthogonal frontal view of interface object 112, where pair of spherical objects 402 are aligned vertically along the X, Z plane. As shown in FIG. 6, when interface object 112 is rotated clockwise by ninety degrees along the X, Y plane, image capture device 104 still detects two generally circular shapes. Since the shapes of spherical objects 402 are not distorted when viewed from different directions and angles, interface object 112 may simply be tracked by detecting two circular shapes.

Figure 7:
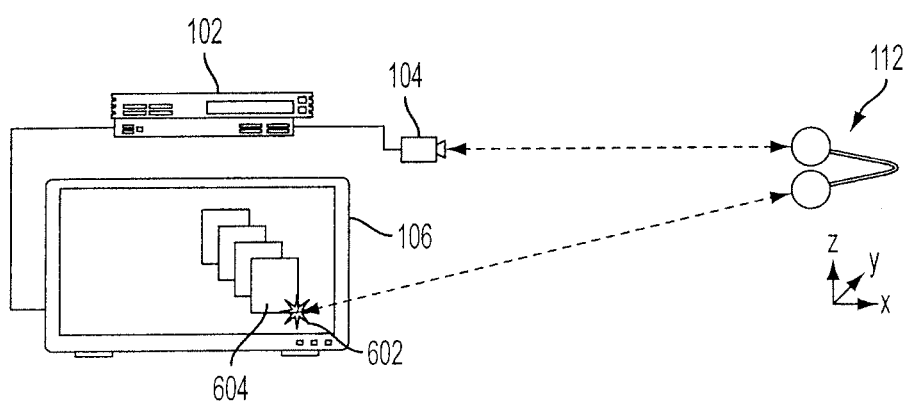
FIG. 7 is a schematic diagram of a system for triggering commands of a program executed on a computing system using the interface object shown in FIGS. 5A and 5B, in accordance with one embodiment of the invention.

FIG. 7 is a schematic diagram of a system for triggering commands of a program executed on a computing system using the interface object shown in FIGS. 5A and 5B, in accordance with one embodiment of the invention. As shown in FIG. 7, image capture device 104 is in communication with computing system 102 which in turn is in communication with display 106. When interface object 112 is provided within field of view of image capture device 104, the image capture device detects the interface object. Interface object 112 is configured to be tracked in the X, Y, and Z directions and enabled to trigger an event of a program executed on computing system 102. Interface object 112 may be tracked through color and/or circular shape as described above. That is, interface object 112 may have a distinct color and distinct circular shape capable of being detected when in the field of view of image capture device 104. In one embodiment, interface object 112 can fit inside the palm of a hand. Thus, with the application of pressure on interface object 112, the pair of spherical objects of the interface object move toward each other from opposite directions along the X, Z plane, and such change in position is detected by image capture device 104. Conversely, image capture device 104 may also detect the spherical objects moving away from each other in opposite directions along the X, Z plane when pressure is released. Additionally, the hand may move interface object 112 along any X, Y, and Z direction relative to image capture device 104. For instance, to detect a change in position of interface object 112 along the X direction, sizes of spherical objects of the interface object captured by image capture device 104 may be compared with pre-programmed reference sizes to determine a distance of the interface object relative to the image capture device. These detected changes in positions are communicated to computing system 102, which in turn result in interfacing commands being triggered on the program executed on the computing system and displayed on display 106. For example, interface object 112 can be used similar to a mouse such that an object of a program such as image 604 or point 602 displayed on display 106 can be selected, accessed and moved around.

In one embodiment, image 604 can be grabbed at point 602 and dragged or manipulated as desired. One skilled in the art will appreciate that any number of suitable operations can be performed, wherein interface object 112 is capable of accomplishing similar functionality as a mouse. Of course, interface object 112 can be used to play a video game or any other suitable interactive game where mouse-like functionality is required. In one embodiment, the relative movements between the spherical objects of interface object 112 trigger interfacing commands comparable to a mouse click which cause objects, such as image 604 and point 602, displayed on display 106 to be selected. Additionally, the change in position of interface object 112 in the X, Y, and Z directions relative to image capture device 104 can cause the objects displayed on display 106 to be moved. For instance, moving interface object 112 causes image 604 to be moved on display 106. One skilled in the art will appreciate that there are an abundance of applications in which the mouse-like functionality described herein can be applied.

Figure 8A:
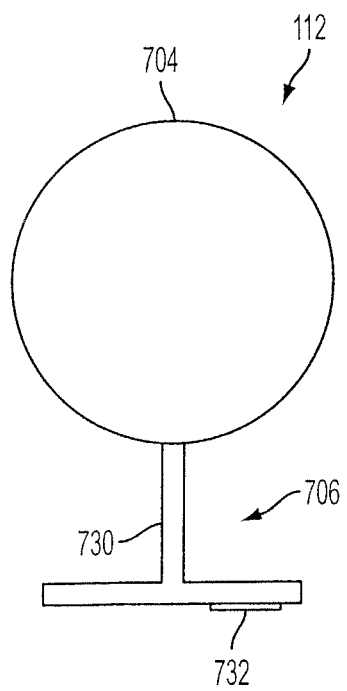
FIGS. 8A, 8B, and 8C are schematic diagrams of alternative embodiments of interface objects.
Figure 8B:
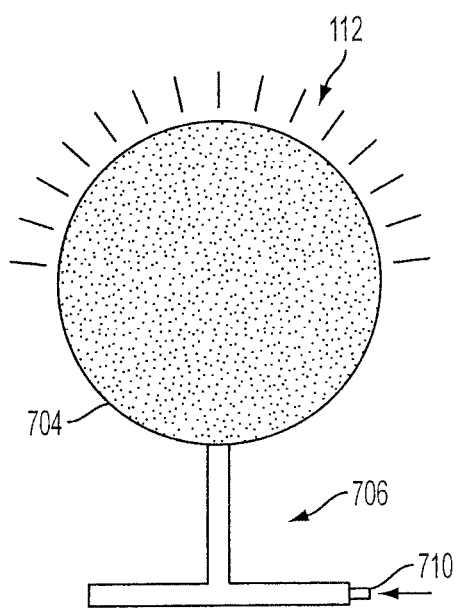
Figure 8C:
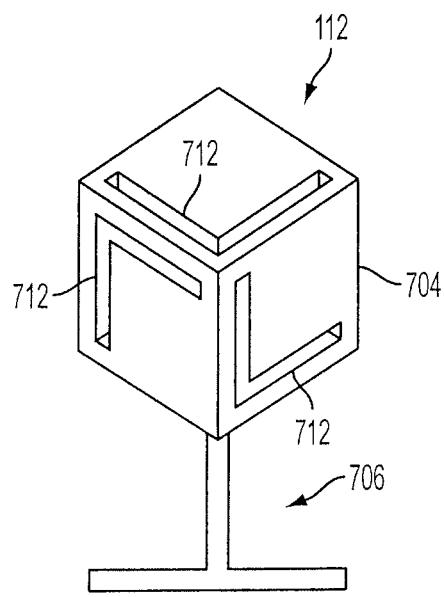

FIGS. 8A, 8B, and 8C are schematic diagrams of alternative embodiments of interface objects. As shown in FIG. 8A, interface object 112 includes object 704 coupled to handle 706. In this embodiment, handle 706 includes first elongated member 732 that is substantially perpendicular to a line extending from object 704, and additionally includes second elongated member 730 with two opposing ends, whereby one end is coupled to about a midpoint of the first elongated member and the other end is coupled to the object. Accordingly, in one embodiment, handle 706 is defined by a T shape. As used herein, the terms "substantially" and "about" mean that the specified dimension or parameter may be varied within an acceptable manufacturing tolerance for a given application. In one embodiment, the acceptable manufacturing tolerance is ±25%. Handle 706 can be any suitable material. Exemplary materials include plastic, wood, ceramic, metal, etc.

As shown in FIG. 8A, object 704 may be spherical in shape. However, object 704 is not limited to a sphere, but may have any suitable shapes. For example, as shown in FIG. 8C, object 704 also may be a cube. Other exemplary shapes of object 704 include a dome, a half sphere, a pyramid, a half cube, etc. Surface of object 704 may have any suitable color or pattern. For example, object 704 may have a black color that contrasts clearly with a white background such that the object can be easily identified. In one embodiment, the color of object 704 can change. For instance, as shown in FIG. 8A, object 704 has a particular color. However, as shown in FIG. 8B, when button 710 is pressed, the button triggers object 704 to change to a different color. In one embodiment, color changes may be facilitated by the inclusion of a colored light source (e.g., light-emitting diode (LED) light) within object 704. The color of object 704 changes when the colored light source is triggered to emit a colored light within the object. Additionally, surface of object 704 may have patterns such that the orientation of the patterns may be detected to determine the orientation of the object relative to the image capture device. The patterns may be any suitable shapes, colors, and sizes. For example, as shown in FIG. 8C, each surface of cube has an L shaped pattern 712. Each L shaped pattern 712 has a different color and different orientation such that the detection of the colors and patterns by the image capture device allows a computing system to determine the orientation and location of interface object 112 relative to the image capture device.

Figure 9A:
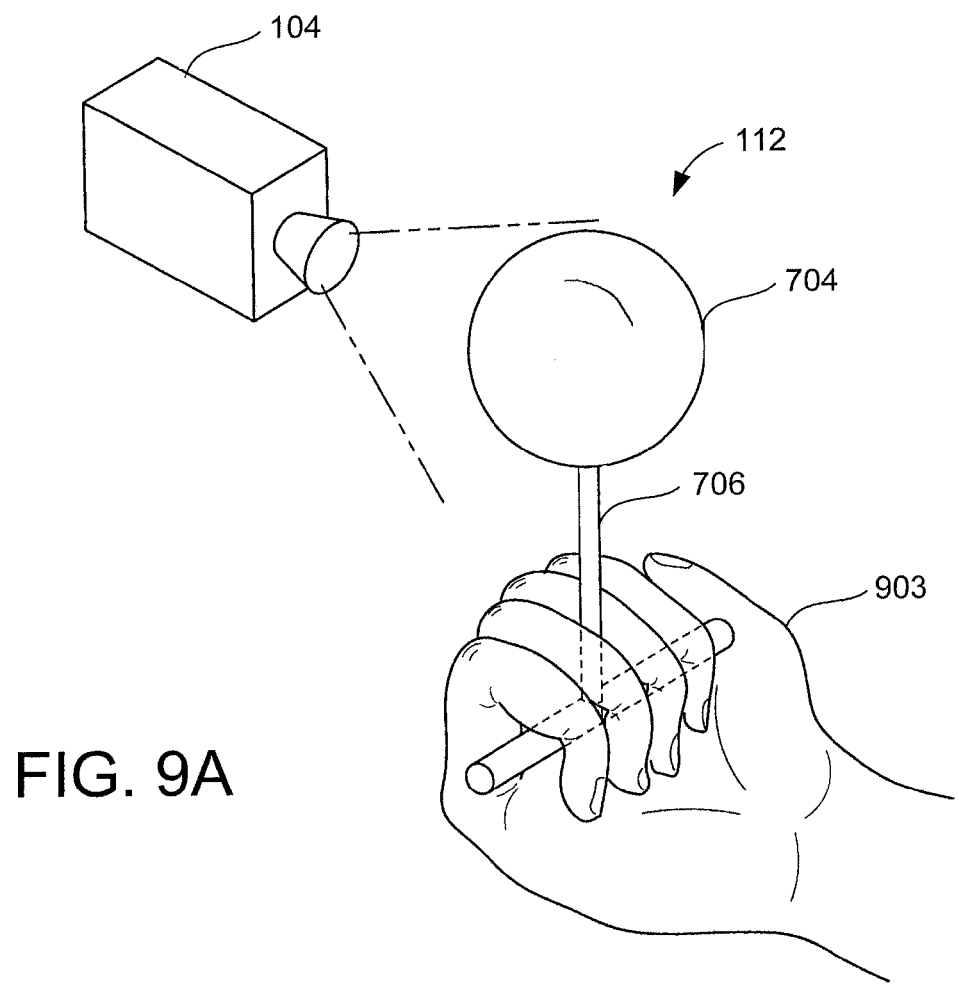
FIGS. 9A and 9B are schematic diagrams of a hand holding the interface object shown in FIGS. 8A-8C.
Figure 9B:
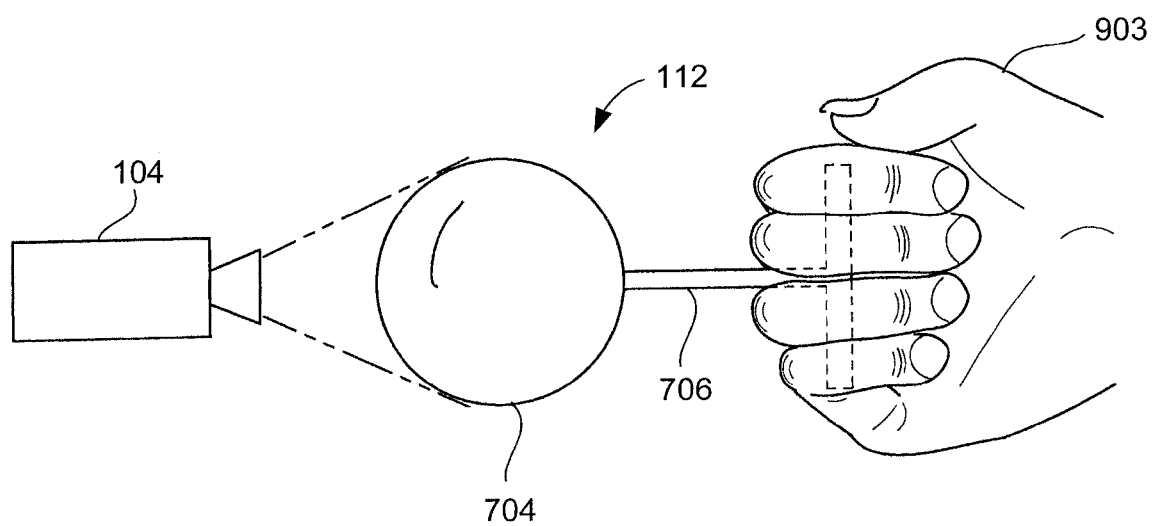

FIGS. 9A and 9B are schematic diagrams of a hand holding the interface object shown in FIGS. 8A-8C. As shown in FIGS. 9A and 9B, interface object 112 is placed within field of view of image capture device 104. Handle 706 is provided to prevent hand 903 holding interface object 112 from blocking object 704. That is, handle 706 is configured to limit hand 903 holding the handle from blocking object 704 from being viewed by image capture device 104. To limit hand 903 from blocking object 704, handle 706 extends away from the object and has an elongated member that is substantially perpendicular to a line extending from the object. Accordingly, hand 903 holding interface object 112 is kept at a distance away from object 704. That is, instead of holding object 704, hand 903 will naturally hold handle 706 such that four fingers fold over the elongated member and palm. The thumb may be placed at either ends of the elongated member. As shown in FIG. 9A, hand 903 may hold interface object 112 such that object 704 points upward or, as shown in FIG. 9B, may hold the interface object such that the object points toward image capture device 104.

Figure 10A:
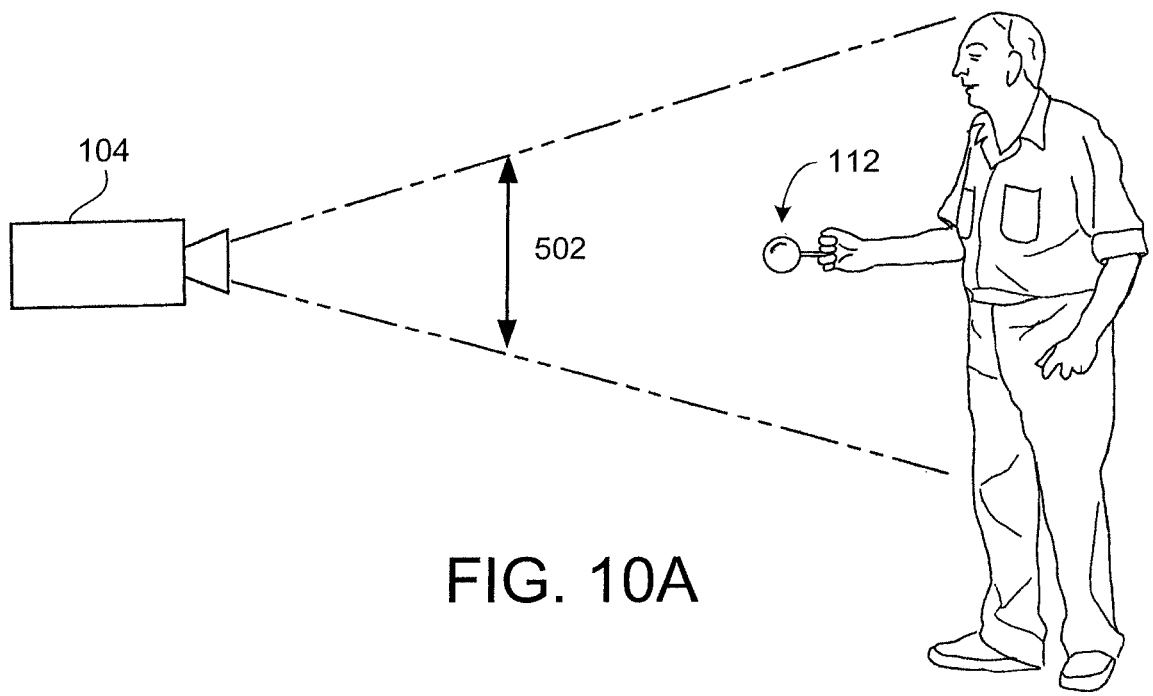
FIGS. 10A, 10B, 10C, and 10D are schematic diagrams of interface objects shown in FIGS. 8A-8C placed within field of view of an image capture device.
Figure 10B:
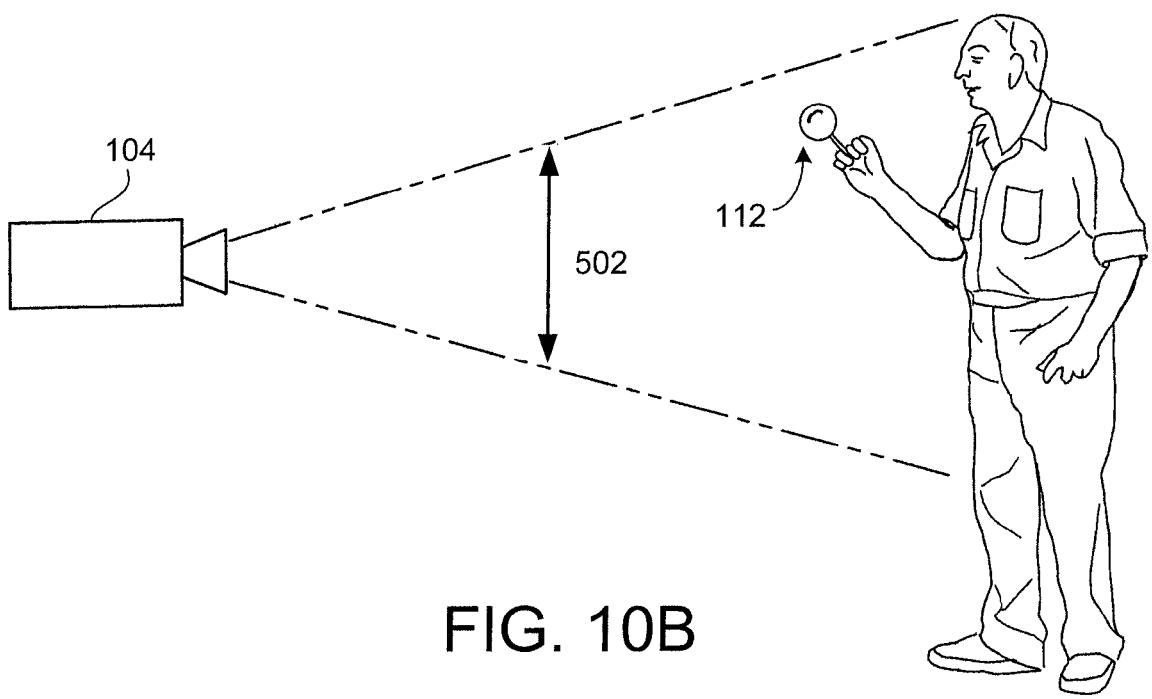
Figure 10C:
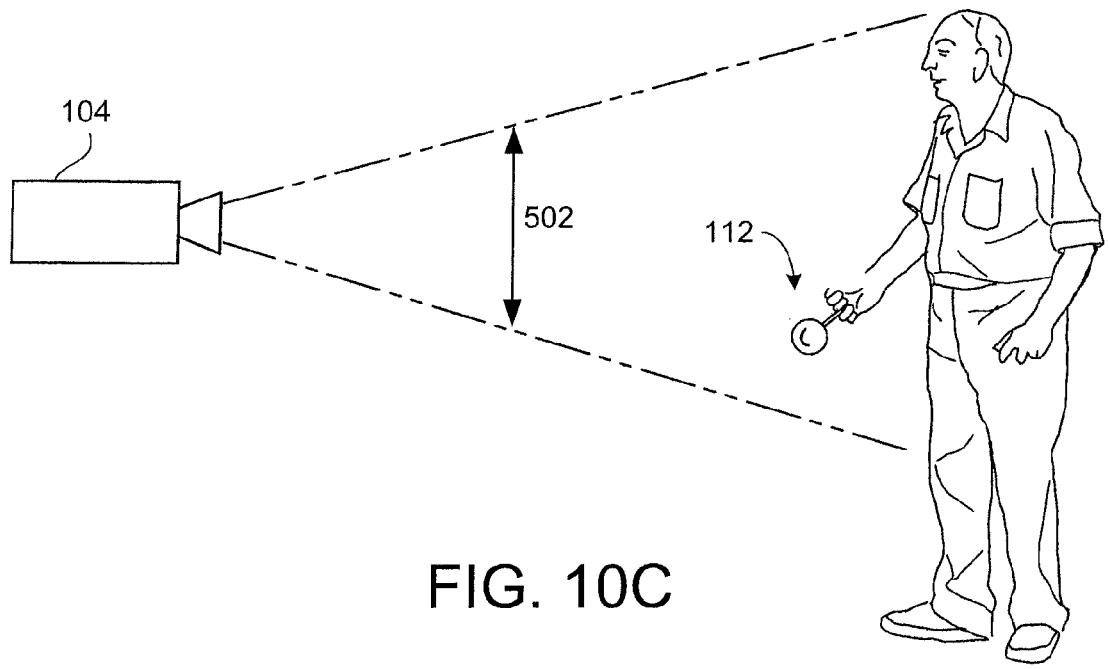

FIGS. 10A-10D are schematic diagrams of interface objects shown in FIGS. 8A-8C placed within field of view of an image capture device. As discussed above, the handle is configured to limit a hand holding interface object 112 from blocking the object coupled to the handle. That is, forcing the hand to naturally hold the handle generally prevents the object coupled to the handle from being blocked from view when a user holds interface object 112 within field of view 502 of image capture device 104. For example, FIG. 10A shows user pointing interface object 112 directly toward image capture device 104. Since the hand holding the handle of interface object 112 is behind the object attached to the handle, image capture device 104 has an unobstructed view of the object. FIG. 10B shows user holding interface object 112 with arm substantially perpendicular to the forearm. At this angle, the hand holding interface object 112 does not block the object coupled to the handle because the hand is placed under the object. Accordingly, image capture device 104 again has an unobstructed view of the object at this angle. Further, FIG. 10C shows user holding interface object 112 with arm and forearm pointing at the floor. At this angle, the hand holding interface object 112 does not block the object coupled to the handle because the hand is behind the object. Thus, image capture device 104 has an unobstructed view of the object even when interface object 112 points to the floor.

Figure 10D:
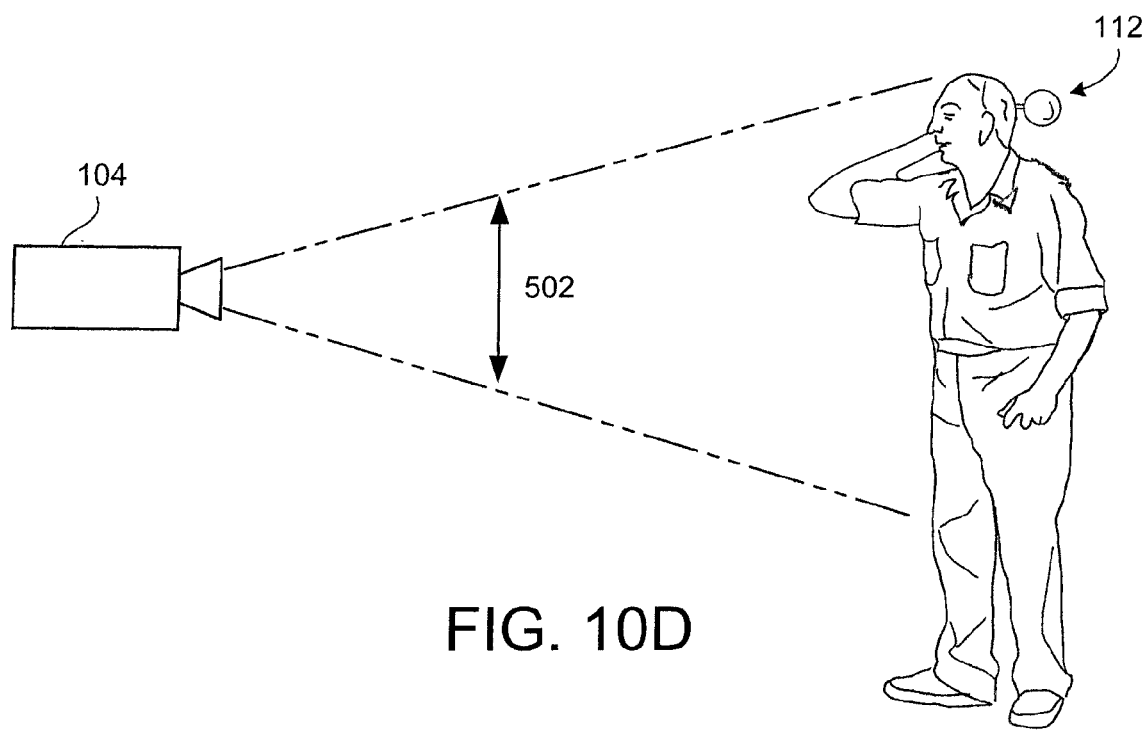

However, the handle cannot completely prevent the object attached to the handle from being blocked when placed within field of view 502 of image capture device 104. As shown in FIG. 10D, the one arm position that can block interface object 112 from view is to point arm and elbow directly toward image capture device 104. The forearm is bent such that interface object 112 is placed behind the shoulder of the user.

Accordingly, this one arm position points interface object 112 away from image capture device 104, and the interface object is placed behind the elbow and forearm. Thus, at this arm angle, the elbow and forearm block interface object 112 from view of image capture device 104.

Figures 11A, 11B:
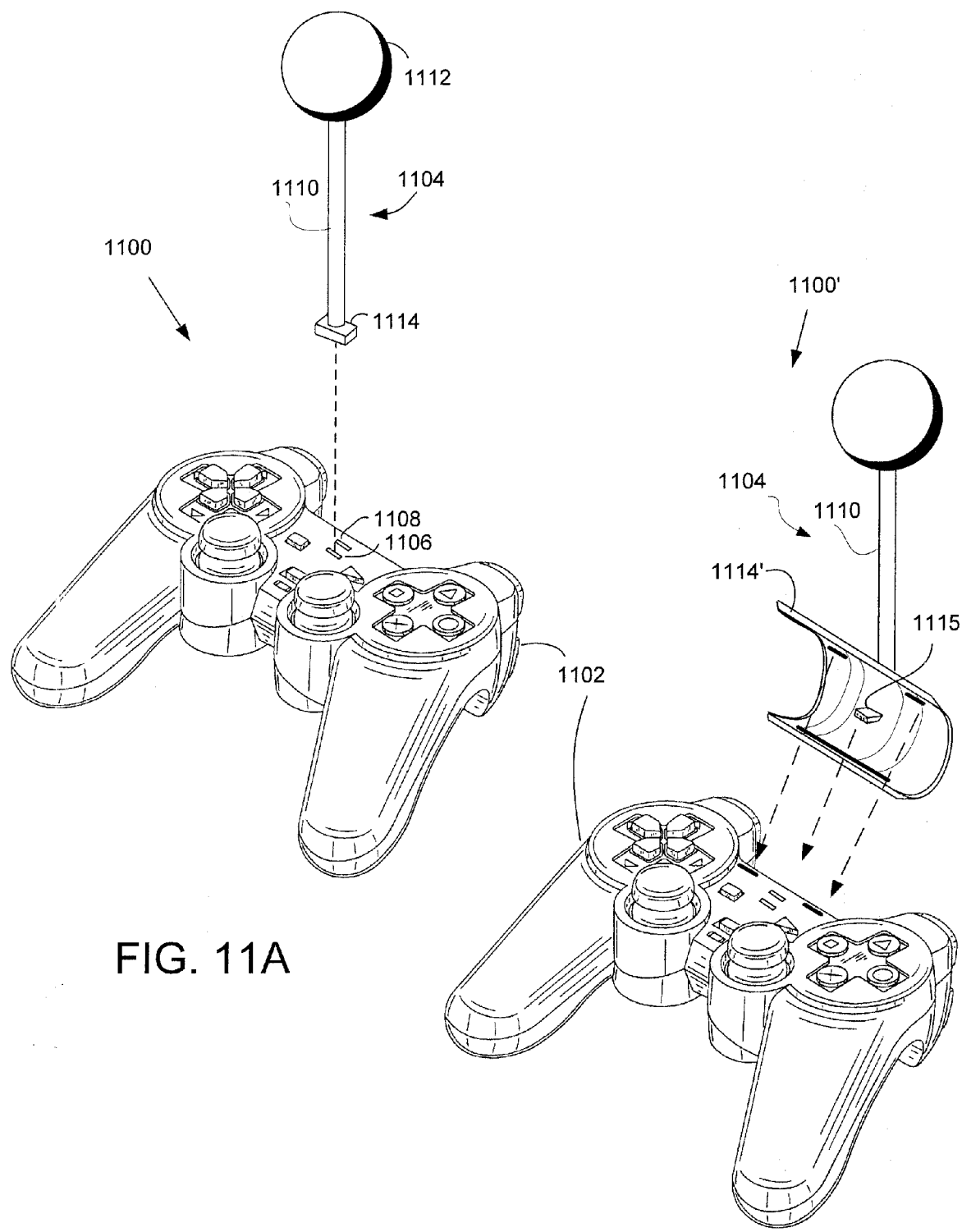
FIGS. 11A and 11B illustrate examples of an interface object connected to a controller, which may be used to interface with a computer program, in accordance with one embodiment of the invention.

FIG. 11A shows an exemplary embodiment 1100, wherein a game controller 1102 has connector 1114 for attaching to an interface object 1104 having an object 1112 connected thereto. The object 1112, as will be described below, may be configured to provide interfacing options with a computing system. In one embodiment, the connector 1114 attaches to mating connector 1106. At the mating connector 1106, additional mechanical stability may be possible by way of a clip or latch mechanism that surrounds or supports the connector 1114 as it interface with the mating connector 1106 on the controller 1102. In another embodiment, the matting connector 1106 includes an mechanical-electrical connection, such as a universal serial bus (USB) port (e.g., a female end of a USB connection). A complementary mating connector 1114 is shown provided at one end of the interface object 1104. The complementary mating connector 1114 can be, in one embodiment, a USB port (e.g., a male end of a USB connection). In another embodiment, two mini USB ports 1106, 1108 may be provided on game controller 1102, for connections to various accessories. Example accessories, without limitation, may include a vibration device, a voice input device, foot-operated pedals, or other such accessories suitable in video gaming systems or general computing systems. Thus, in one embodiment, interface object 1104 is provided as an accessory to game controller 1102, and it can be attached or removed depending on the desired interfacing implementation.

In the case where the mating connector 1106 includes a communications port, such as a mini-USB port, additional interactive features may be provided to interface object 1104. For example, interface object 1104 may include a photoelectric illuminator such as an LED and/or a sound generating device such as a speaker. In exemplary embodiments, interface object 1104 is placed in electronic communication with computing system 102 (FIG. 2) via game controller 1102 and can therefore respond in an interactive way to the program being executed on computing system 102 (FIG. 2).

In one embodiment, a post 1110 may be ridged, semi-ridged, can have joints, hinges, or can be elastically deformable so as to allow it to flex without breaking. For example, post 1110 can be formed of a plastic material having viscoelastic properties or a soft plastic with an elastic spring interior. In embodiments where object 1112 includes an illuminating means, post 1110 may be hollow or molded around electrical conductors (see FIG. 15) which extend from object 1112 to interface object connector 1114, which can be, for example, a mini USB plug. Thus, post 1110 may be an elongated member that extends from object 1112 to connector 1114.

In one embodiment, object 1112 may be a spheroid of translucent plastic material allowing an illuminating means within object 1112 to illuminate object 1112. Using multicolor and/or modulating LED devices, object 1112 can be illuminated to varying degrees of brightness and to different colors depending on data received from game controller 1102 or associated computing device (wired or wireless). A circuit (FIG. 15) may be positioned within object 1112, connector 1114, post 1110, or along different sections of the controller 1102, connector 1114 or post 1110. In one embodiment, the circuit interprets received data and powers the illuminators with appropriate voltages to generate the desired color and brightness. The resulting colors and/or brightness can be modulated and can be triggered in response to an interactive interface with the computer program or game sequence.

FIG. 11B illustrates another controller 1102, having a conformal connector 1114'. In one example, the conform connector 1114' may function like a clamp that clips on to the controller. Conformal connector 1114' is, in another embodiment, configured to mate with a front surface region of the controller 1102. The conformal connector 1114' is provided with a male USB connector 1115, that will plug into a female connector (not shown) on the front face of the controller 1102. The conformal connector 1114' is also configured with appropriate clipping structure to enable a snug and stable fit with the front face of the controller 1102. In this manner, play with the controller 1102, although sometimes can be a bit rough when players/users get excited during game play, the interface object 1104 will remain substantially stable and attached to the face of the controller 1102.

Although exemplary shapes and structure have been provided to illustrate ways of attaching the interface object 1104 to the controller 1102, it should be understood that other ways of securing the interface object 1104 can be provided. Additionally, it should be understood that other types of electrical communication connectors may be possible other than USB, as other specialized connectors, proprietary connectors, custom connectors and standard connectors can be used to communicate the electrical signals between the controller 1102 and the interface object 1104.

Figure 12A:
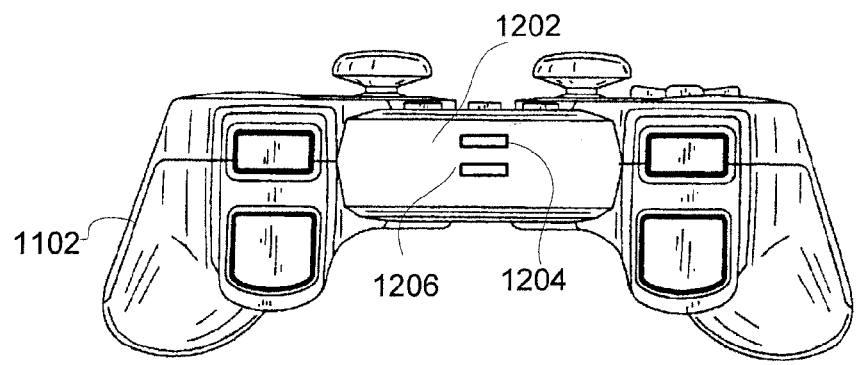
FIGS. 12A and 12B illustrate examples for alternate connection surfaces for connecting one or more interface objects to a controller, in accordance with one embodiment of the invention.
Figure 12B:
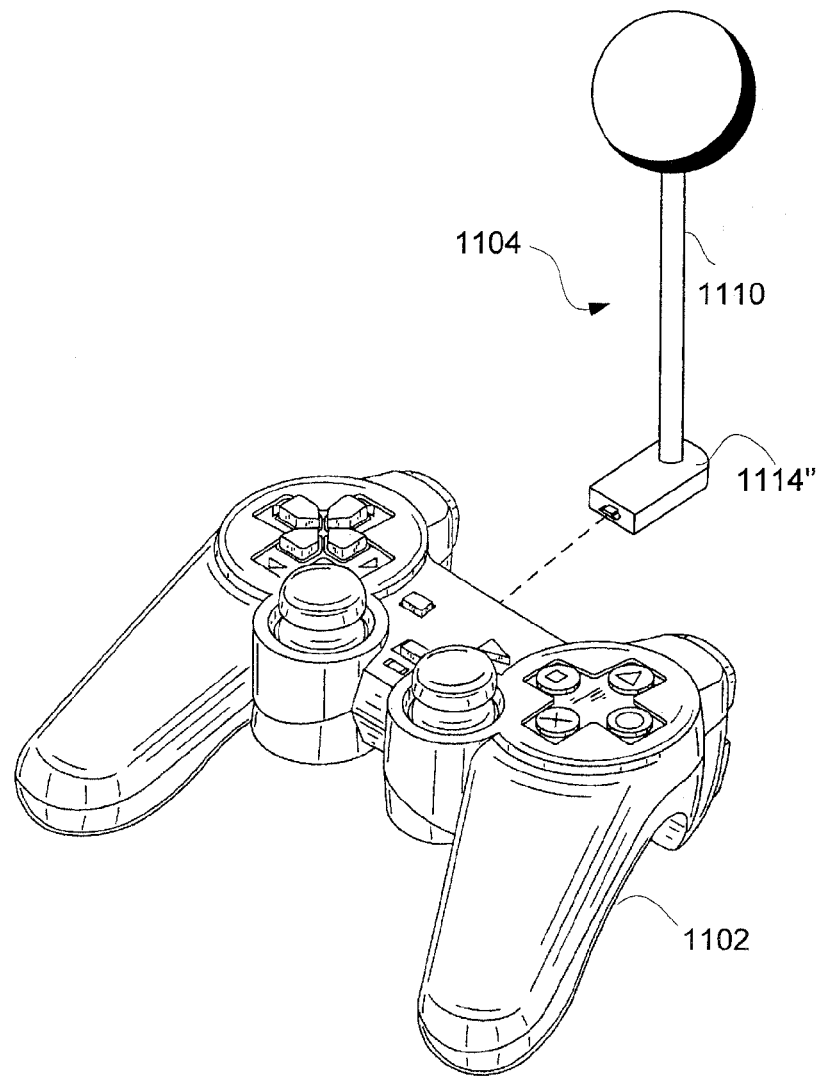

FIGS. 12A and 12B show an alternative embodiment wherein the connection is made to at least one of rear connectors 1204 and 1206, positioned on a back face 1202 of game controller 1102. In one embodiment, interactive object 1104 (FIG. 11) may be connected to rear connector 1204 or 1206, such that post 1110 of interactive object 1104 extends horizontally away from game controller 1102. In another embodiment, game controller 1204 includes a 90-degree bend (or any other suitable angle) causing post 1110 to extend vertically up from connector 1114'', as shown in exploded form in FIG. 12B.

Figure 13A:
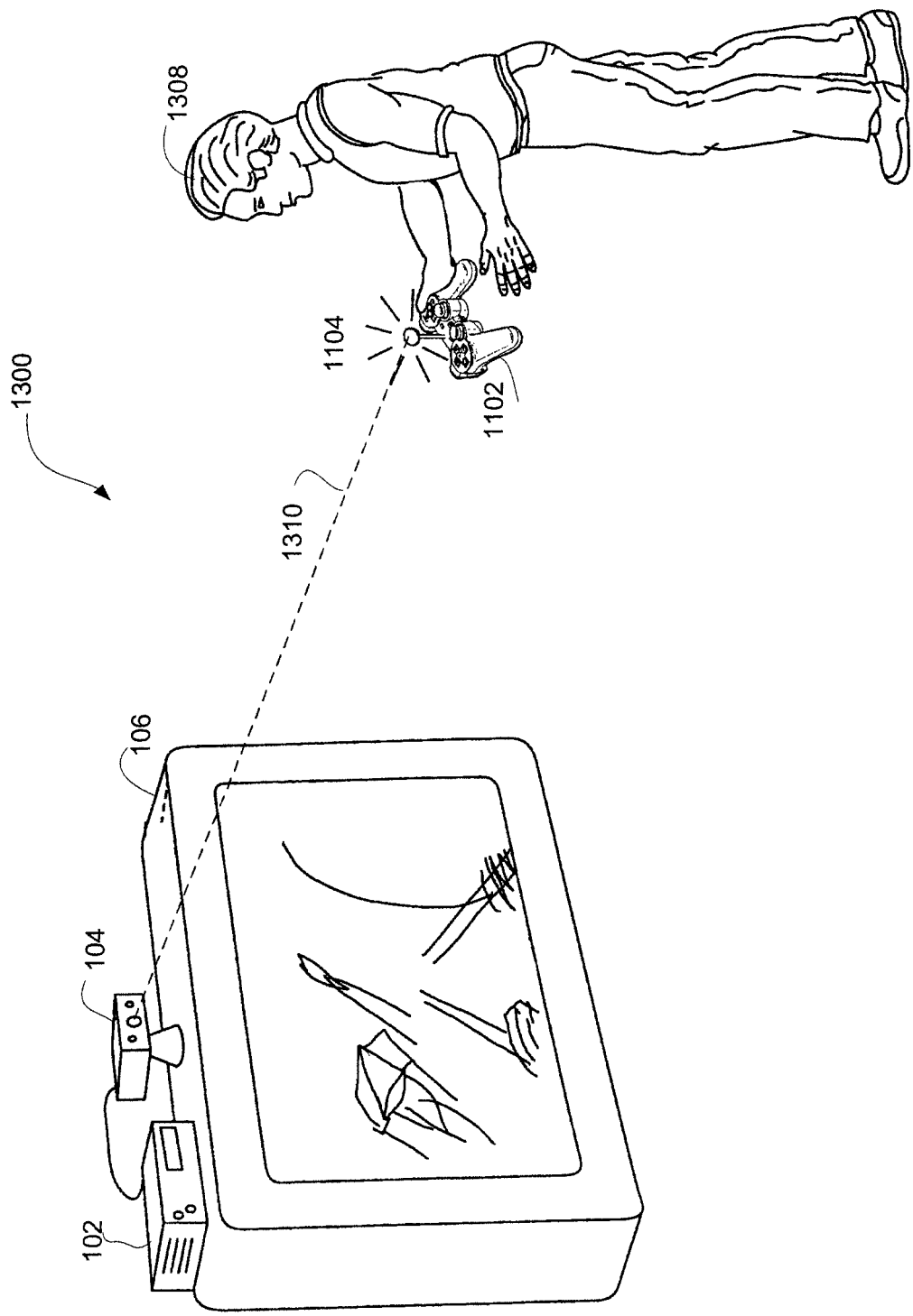
FIGS. 13A and 13B illustrate examples of a controller having an interface object connected thereto, in detection communication with a computing device, in accordance with one embodiment of the invention.

In FIG. 13A, game interface system 1300 includes computing system 102 in electrical communication with image capture device 104, such that computing system 102 receives video image data from image capture device 104, as described above with reference to FIG. 2. In this embodiment, user 1308 operates a game controller 1102 having an interface object 1104 attached thereto. As mentioned previously, interface object 1104 can respond to action in the application program being executed on computing system 102, such as a game program or general computer driven programs.

In one example, if the game program is a flight simulation program, the interface object 1104 may change color, blink, modulate, etc., when missiles are armed, fuel is low, or a target is locked-in. In addition, movement of interface object can be interpreted from the video image data received from image capture device 104, so long as interface object 1104 is in view of image capture device 104. Thus, in the flight-simulation example, movement of game controller 1102 can be used to steer or otherwise operate the vehicle, while buttons, joysticks, and other control devices on game controller 1102 can be used to actuate various systems, such as select or change camera angle, select weapon type, etc.

In one embodiment, game controller 1102 communicates wirelessly to computing system 102 as shown in FIG. 13A. For example, game controller 1102 may include wireless Wi-Fi IEEE 802.11x compliant radio transceiver or an infrared (IR) modulator for communicating wirelessly to computing device 102, which will have a compatible IR transceiver or sensor unit (not shown). In another embodiment, game controller 1102 communicates visually using interactive object 1104 or other light-emitting devices on controller (not shown) for transmitting user commands to computing device 102 by way of image capture device 104. Additional details relating to this technology are provided in related U.S. patent application Ser. No. 11/429,414 entitled "Computer Image And Audio Processing of Intensity And Input Devices For Interfacing With A Computer Program," filed on May 4, 2006, which is incorporated herein by reference.

Figure 13B:
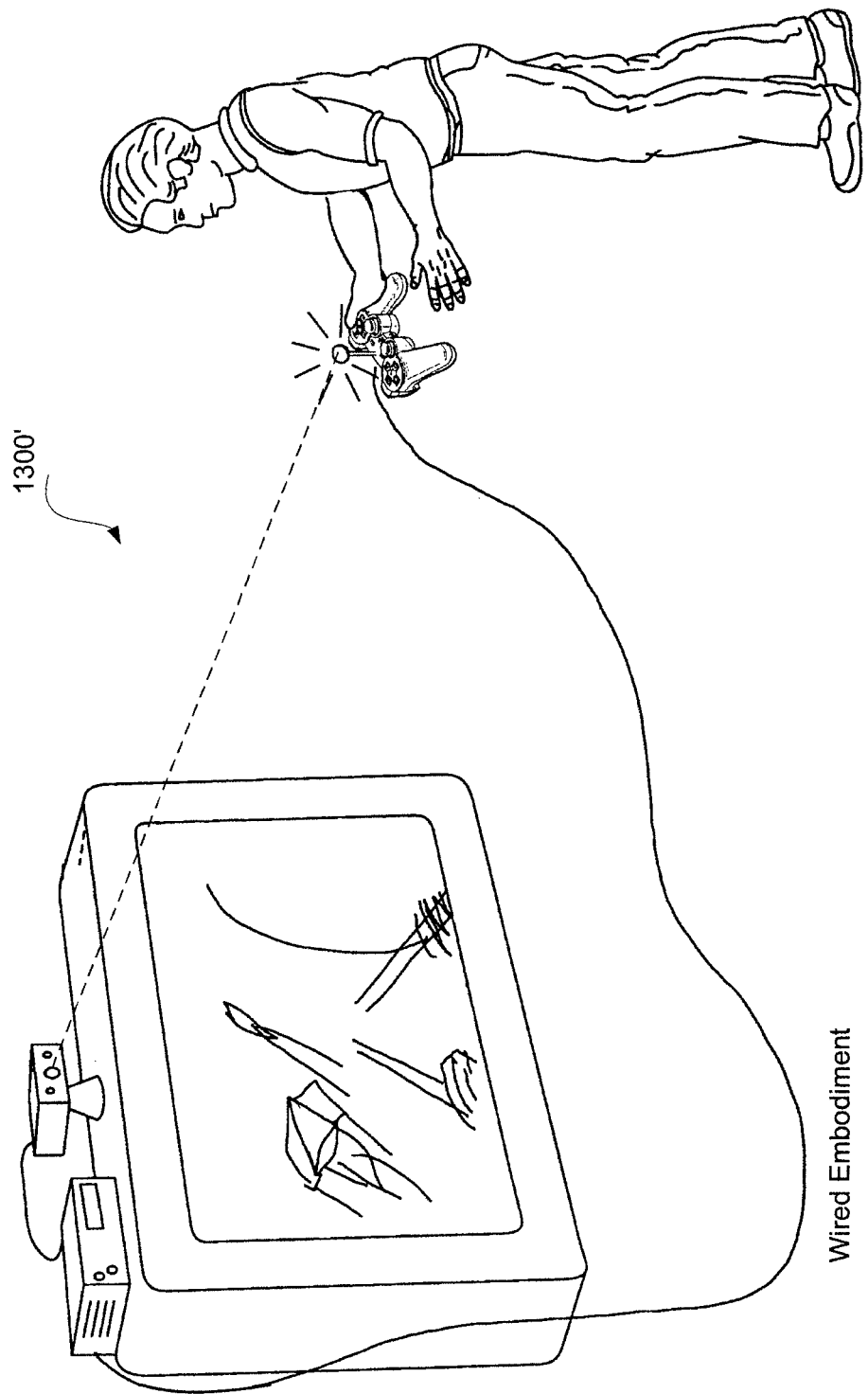

In operation, image capture device 104 images a field of view and transmits video data representing the visual field of view as seen by image capture device 104. Computing device 102 interprets the video data and identifies the position of interactive object 1104 with respect to the video frame. This position data can then be sent to the program or software routine requesting the data. In another embodiment, image capture device 104 includes a microprocessor or digital signal processor for interpreting image data internal to image capture device 104, and then sends position data to computing device 102 of the field of view to identifies interactive object 1104. FIG. 13B illustrate an example 1300' where the controller 1102 is connected to the computing device 102 via a cable, instead of the wireless connection of FIG. 13A. In this example, the wire may be connected to the controller via another USB connection or the connection may be integrated with the controller.

Figure 14A:
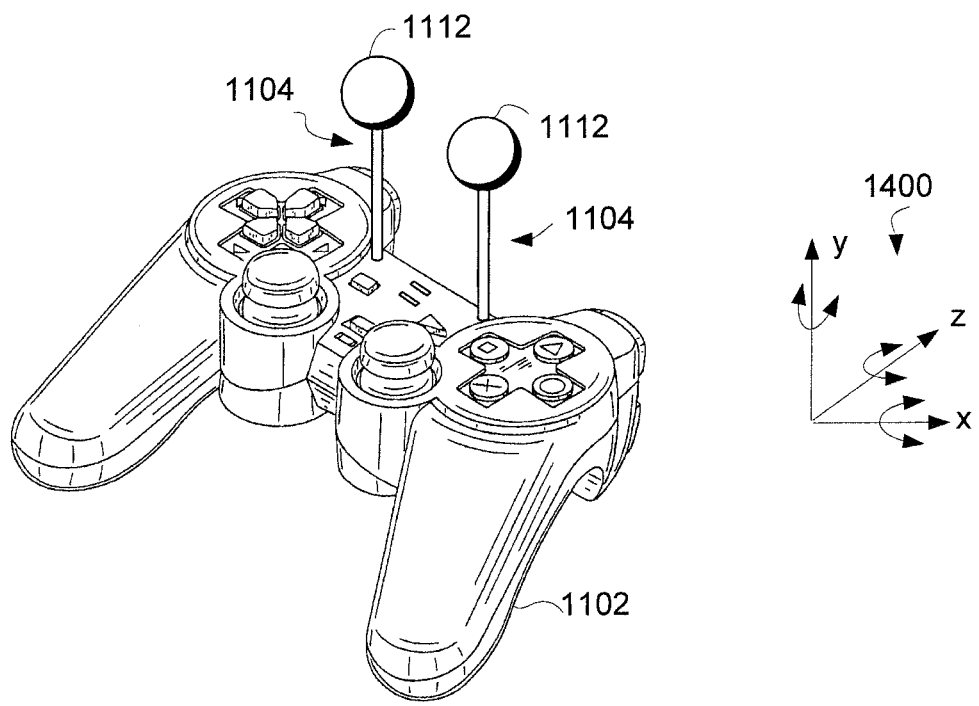
FIGS. 14A-14D illustrate alternate examples for connecting one or more interface objects to a controller, in accordance with one embodiment of the invention.
Figure 14B:
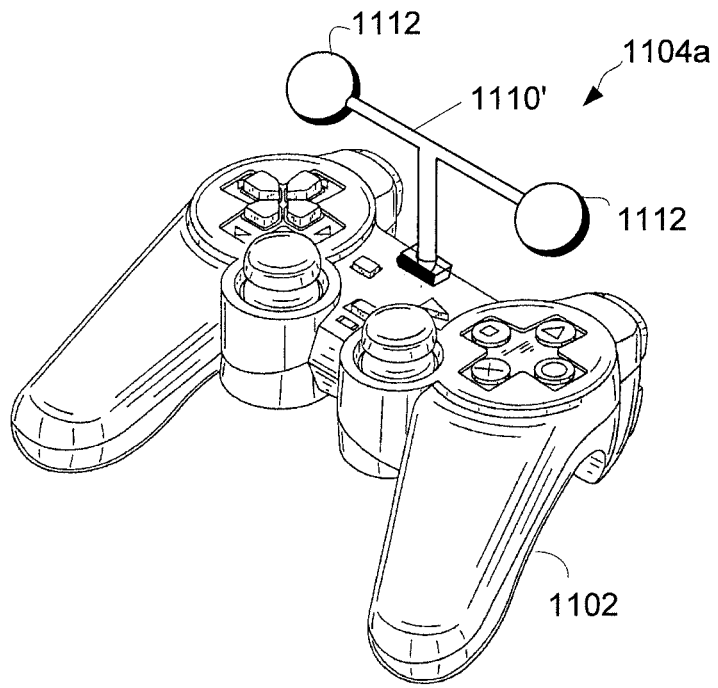

FIG. 14A illustrates a controller 1102 in which interface objects 1104 can be connected to different sections of the body of the controller 1102. In this example, by having two interface objects 1104, it is possible for the computing device 102 to determine spatial positions 1400. Examples of spatial positions 1400 may include tilts, rolls and yaw, as may be used in the aforementioned flight simulation program. The connection of the posts 1110 to the controller 1102 may be by way of USB connections, or other connections that enable either one or more of electrical lines, wiring, sound, light or general transmission of signals. In the example of FIG. 14B, an interface object 1114a is provided, with a cross-post 1110' configuration. As shown, the cross-post 1110' is able to connect to two objects 1112. The cross-post 1110' is only one example, and other post configurations are possible.

Figure 14C:
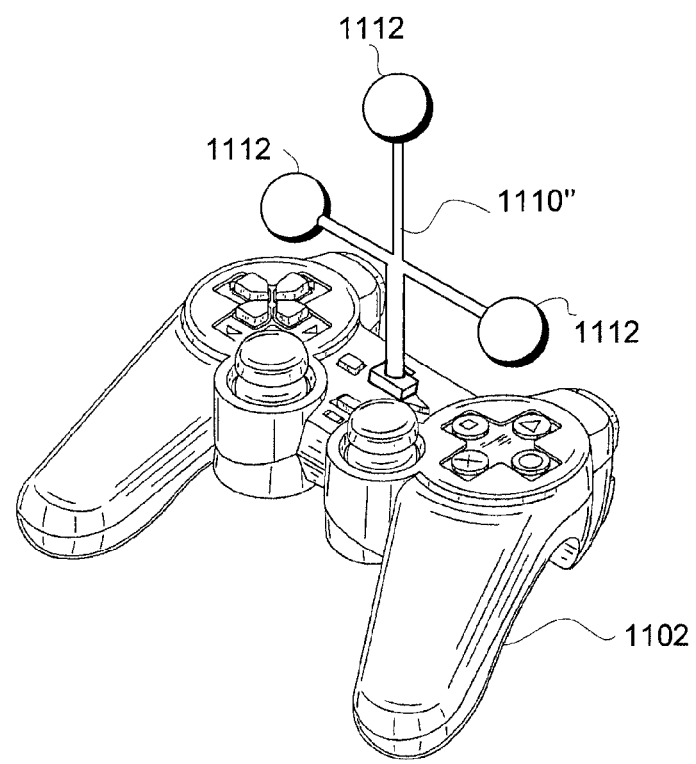
Figure 14D:
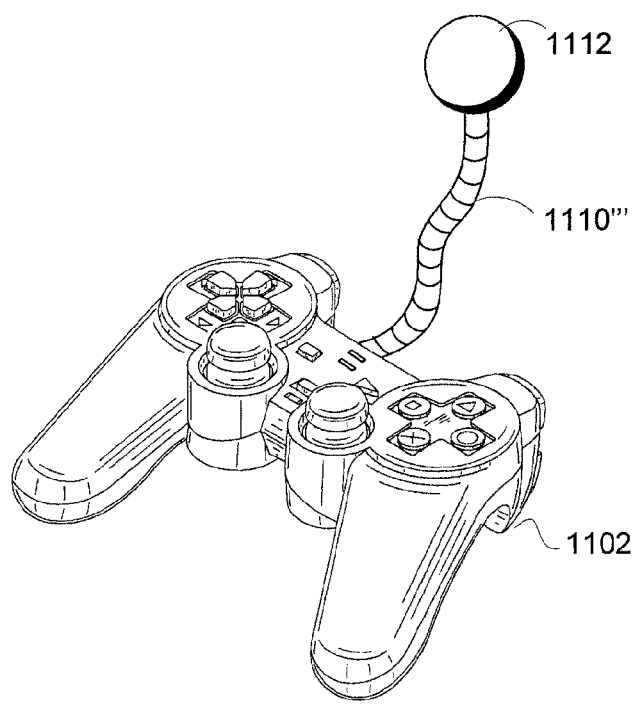

FIGS. 14C and 14D illustrate other such configuration of the post. For instance, in FIG. 14C, the post 1110" provides a full cross configuration, and in FIG. 14D, the post 1110'" provides a flexible member. The objects 1112 can therefore interface through the posts and can provide the additional positioning information mentioned above.

Figure 15:
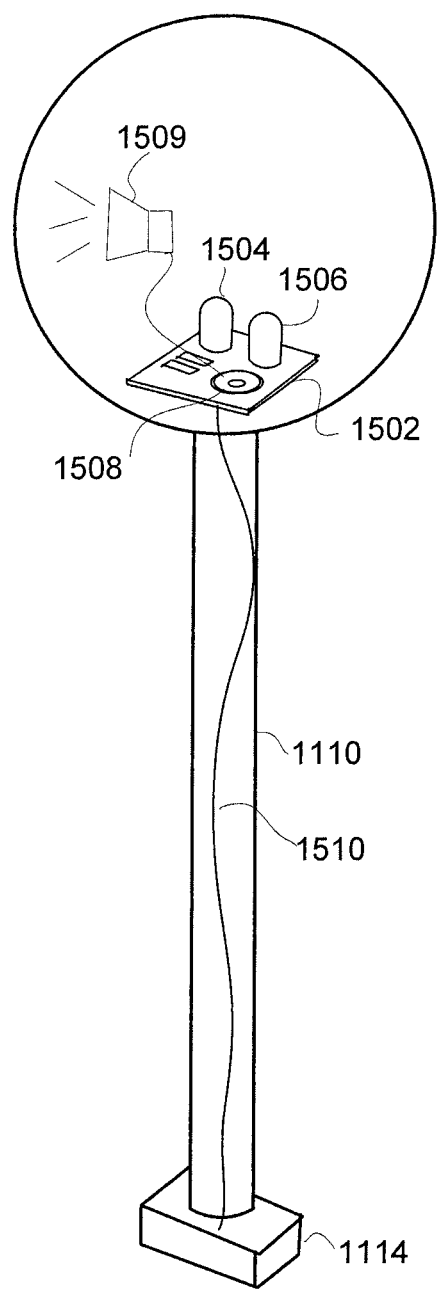
FIG. 15 illustrates an example circuit, speaker, and light devices that can be integrated into an object of the interface object, in accordance with one embodiment of the invention.

FIG. 15 illustrates one example, where a post 1110 is shown interfaced between a connector 1114 and the object 1112. A circuit 1502 for driving, controlling or switching the color illumination may be provided inside the object 1112. In other examples, the circuit can be located in the controller 1102 or at the computing device 102. If the circuit is inside of the object 1112, the circuit 1502 may have light emitting diodes (LEDs) 1504 and 1506. The LEDs 1504 and 1506 can be of the same color or different colors. The LEDs 1504 and 1506 can be modulated, change in degrees of intensity or operate independently from one another. The circuit 1502 can also include a speaker or interface with a speaker 1509. The speaker can be driven to output sounds that are either in synchronization with the lights or independently generating sounds or vibrations depending on the interactive implementation.

Figure 16:
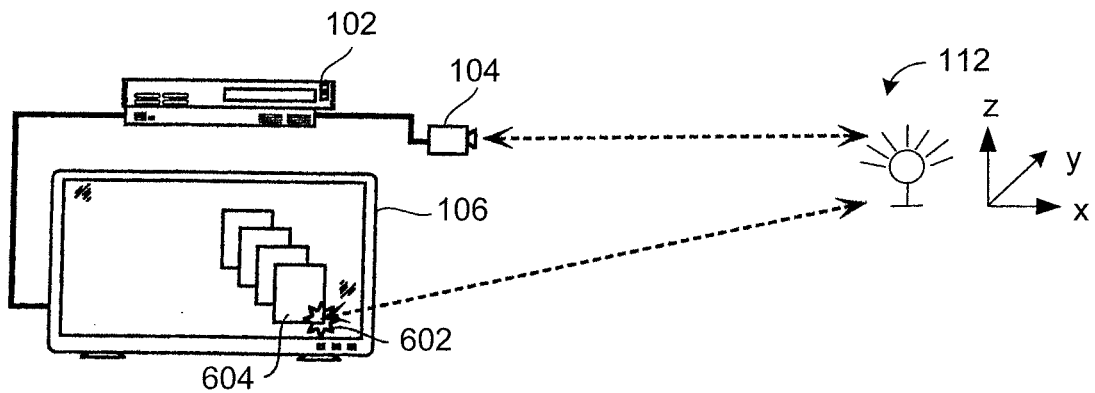
FIG. 16 is a schematic diagram of a system for triggering commands of a program executed on a computing system using the interface object shown in FIGS. 8A-8C, in accordance with one embodiment of the invention.

FIG. 16 is a schematic diagram of a system for triggering commands of a program executed on a computing system using the interface object shown in FIGS. 8A-8C, in accordance with one embodiment of the invention. As shown in FIG. 11, image capture device 104 is in communication with computing system 102 which in turn is in communication with display 106. When interface object 112 is provided within field of view of image capture device 104, the image capture device detects the interface object. Interface object 112 is configured to be tracked in the X, Y, and Z directions and enabled to trigger an event that may be displayed on a display. Interface object 112 may be tracked through color and/or shape as described above. That is, interface object 112 may have a distinct color and distinct shape capable of being detected when in the field of view of image capture device 104. A hand holding interface object 112 may move the interface object along any X, Y, and Z direction relative to image capture device 104. Additionally, the color of interface object 112 may be changed. Image capture device 104 can detect these changes in position and color, and these detected changes are communicated to computing system 102, which in turn result in interfacing commands being triggered on programs executed on the computing system and displayed on display 106. For example, interface object 112 can be used similar to a mouse such that an object such as image 604 or point 602 displayed on display 106 can be selected, accessed, and moved around. In one embodiment, the change in color of interface object 112 triggers an interfacing command comparable to a mouse click which causes objects, such as image 604 and point 602, displayed on display 106 to be selected. Additionally, the change in position of interface object 112 in the X, Y, and Z directions relative to image capture device 104 causes the objects displayed on display 106 to be moved. Thus, interface object 112 may be used to grab image 604 at point 602 and drag or manipulate the image as desired. Again, one skilled in the art will appreciate that there are an abundance of applications in which the mouse-like functionality described herein can be applied.

Figure 17:
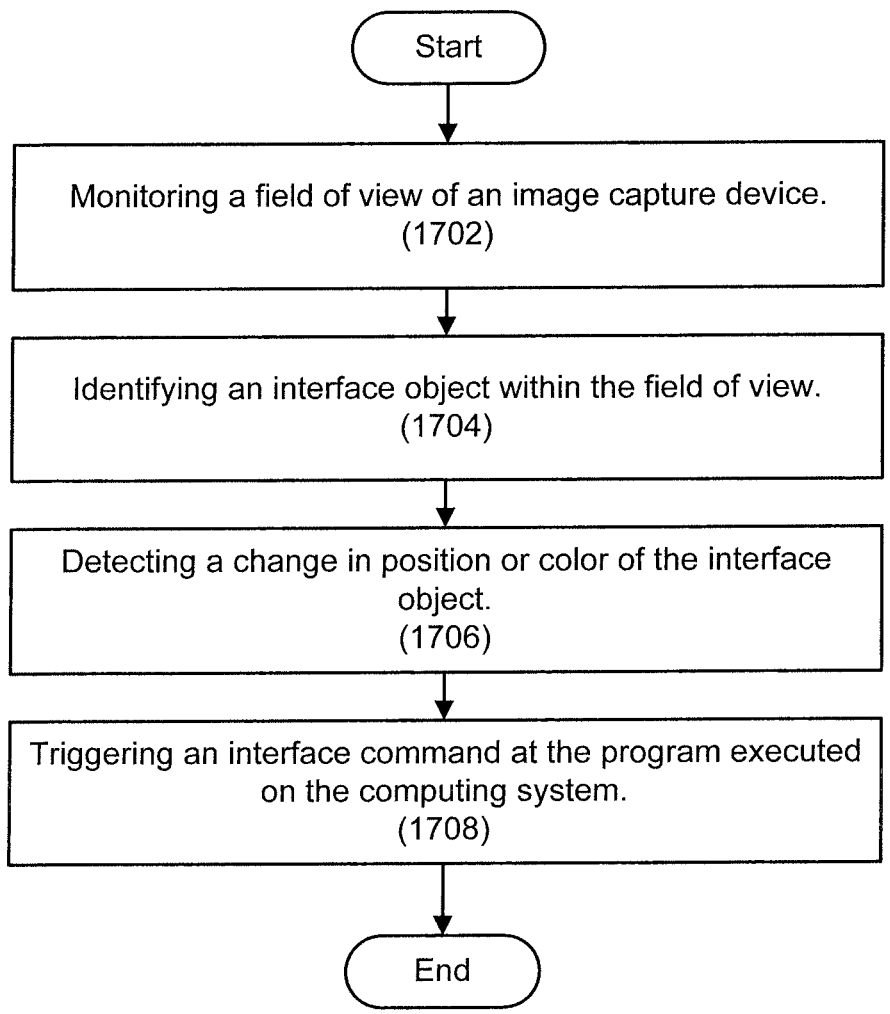
FIG. 17 is a flowchart of a high level method operations for triggering commands of a program executed on a computing system, in accordance with one embodiment of the present invention.

FIG. 17 is a flowchart of a high level method operations for triggering commands of a program executed on a computing system, in accordance with one embodiment of the present invention. Starting in operation 1702, a field of view of an image capture device is monitored. An interface object is provided and placed within the field of view of the image capture device. As discussed above, in one embodiment, the interface object is defined by a pair of spherical objects. In another embodiment, the interface object is defined by an object attached to a handle, whereby the handle has an elongated member being substantially perpendicular to a line extending from the object.

As shown in FIG. 17, the interface object is identified 1704 within the field of view, and change in position or color of the interface object may be detected 1706. As discussed above, in one embodiment, the change in position may be the movement of the interface object relative to the image capture device or, in another embodiment, may be the movement of the pair of spherical objects of the interface object relative to each other. Moreover, in one embodiment, the color changes may be facilitated by emitting a colored light within the interface object. In operation 1708, the change in position or color then triggers an interfacing command at the program executed at the computing system. Exemplary interfacing commands include selecting an object on a display, moving an object on the display, starting a computer program, etc.

In summary, the above described invention provides method and system for triggering commands of a program executed on a computing system. In one embodiment, the interface object is defined by a pair of spherical objects coupled to a handle. The handle limits a hand holding the handle from blocking the pair of spherical objects from being viewed by the image capture device. Each of the spherical object has a circular-like shape when viewed from any direction and angle. The one or more spherical objects may be perfectly spherical or not. Since the shapes of spherical objects are not distorted when viewed from different directions and angles, image capture device can reliably track interface object by detecting the unobstructed, circular shapes. The shapes of the objects can also be detected, however, if the objects are not circular, and thus, other shapes are also envisioned. In another embodiment, the interface object is defined by an object coupled to a T shaped handle. Instead of holding the object, the hand will naturally hold handle such that it is difficult for the hand to block the object from being viewed by the image capture device. The interface objects described above allow a user to conveniently use and hold the interface objects because the user simply has to grasp a handle and hold the corresponding interface object within field of view of image capture device to trigger an interfacing command. The objects can also be connected to a controller used in video game play. The objects can be interfaced via a connector, and the objects can be powered with lighting, sounds or other effects that provide additional interactive detectable sights, sounds, configurations or positions.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A controller for interfacing with a computer program executed on a computing system that processes image data captured of an interfacing space that is defined in front of a display, the controller comprising:
   a controller body having at least one button for triggering communication input data wirelessly to and from the computing system, the controller body configured to be held by a hand of a user;
   a spherical object connected to one end of the controller body, the spherical object defined from a translucent material; and
   illumination device for illuminating the spherical object from within the spherical object, the illumination device configured to light up the translucent material in one or more colors, a resulting one of the one or more colors being set using data received from the computer program executing on the computing system;
   wherein the controller body includes wireless communication circuitry;
   wherein the illumination device is defined from a light emitting diode (LED) device;
   wherein the LED device is activated depending on data received from the computing system during execution of the computer program.

2. The controller of claim 1, wherein the computer program is an interactive video game.

3. The controller of claim 1, wherein the controller body includes a Universal Serial Bus (USB) connector.

4. The controller of claim 3, wherein the USB connector is integrated into the controller body at an opposite end from the end having the spherical object.

5. The controller of claim 1, wherein the controller body is a handle, and the handle is defined from a plastic material.

6. An interfacing device for communicating with a computer program executed on a computing system, the interfacing device comprising:
   a controller body having at least one button for communicating input data wirelessly to the computing system, the controller body having a shape for holding by a human hand;
   an object connected to one end of the controller body, the object defined from a translucent material; and
   illumination device for illuminating the object from within the object, the illumination device configured to set a brightness of the translucent material based on data received from the computer program executed on the computing system;
   wherein the illumination device is defined from a light emitting diode (LED) device;
   wherein the LED device is activated depending on data received from the computing system during execution of the computer program.

7. The interface object of claim 6, wherein the controller body includes wireless communication circuitry.

8. The interface object of claim 6, wherein the computer program is an interactive video game.

9. The interface object of claim 6, wherein the controller body includes a Universal Serial Bus (USB) connector.

10. The interface object of claim 9, wherein the USB connector is integrated into the controller body at an opposite end from the end having the object.

11. The interface object of claim 6, wherein the controller body is a handle, and the handle is defined from a plastic material.

12. The interface object of claim 6, wherein the object is one of a sphere, a dome, a partial sphere or dome, a cube, a pyramid, or a half cube.

13. The interface object of claim 6, further comprising a vibration feedback device defined as part of the interface object.

14. A controller, comprising;
   a handle having at least one button;
   a spherically shaped object connected to only one end of the handle, the spherically shaped object defined from a translucent plastic material;
   an illuminating device within the spherically shaped object;
   a circuit for interpreting input data from the at least one button and communicating data wirelessly with a computing system, the circuit further configured to interface with the illuminating device to trigger illumination of the spherically shaped object to switch from an un-illuminated color to an illuminated color based on data received wirelessly from the computing system;

wherein the illumination device is defined from a light emitting diode (LED) device;

wherein the LED device is activated depending on data received from a computing system.

15. The controller of claim 14, the controller further comprising a power source for driving the illuminating device and the circuit.

16. The controller of claim 15, wherein the illuminated color is one or more colors and one or more levels of brightness.

17. The controller of claim 14, wherein the handle includes a Universal Serial Bus (USB) connector at an opposite end from the end having the spherical object.

18. The controller of claim 14, wherein the handle is defined from a plastic material.

19. The controller of claim 14, further comprising a vibration feedback device.

* * * * *